US011556889B2

(12) United States Patent
Corona et al.

(10) Patent No.: US 11,556,889 B2
(45) Date of Patent: Jan. 17, 2023

(54) OBJECT RECOGNITION SYSTEM FOR AN APPLIANCE AND METHOD FOR MANAGING HOUSEHOLD INVENTORY OF CONSUMABLES

(71) Applicant: WHIRLPOOL CORPORATION, Benton Harbor, MI (US)

(72) Inventors: Enrique Corona, St. Joseph, MI (US); David Edwards, South Bend, IN (US); Michael T. Moore, Paw Paw, MI (US); Ryan M. Post, Coloma, MI (US)

(73) Assignee: Whirlpool Corporation, Benton Harbor, MI (US)

( * ) Notice: Subject to any disclaimer, the term of this patent is extended or adjusted under 35 U.S.C. 154(b) by 263 days.

(21) Appl. No.: 16/589,621

(22) Filed: Oct. 1, 2019

(65) Prior Publication Data
US 2020/0027056 A1 Jan. 23, 2020

Related U.S. Application Data

(63) Continuation of application No. 15/198,258, filed on Jun. 30, 2016, now Pat. No. 10,474,987.
(Continued)

(51) Int. Cl.
*G06Q 10/08* (2012.01)
*F25D 29/00* (2006.01)
(Continued)

(52) U.S. Cl.
CPC .......... *G06Q 10/087* (2013.01); *F25D 29/00* (2013.01); *G06K 9/6267* (2013.01);
(Continued)

(58) Field of Classification Search
CPC .............. G06Q 10/087; G06Q 30/0633; F25D 2500/06
See application file for complete search history.

(56) References Cited

U.S. PATENT DOCUMENTS

| 1,997,432 A | 4/1935 | Replogle |
| 3,647,075 A | 3/1972 | Aue |

(Continued)

FOREIGN PATENT DOCUMENTS

| EP | 2784419 | 10/2014 |
| EP | 2792980 | 10/2014 |

(Continued)

*Primary Examiner* — Florian M Zeender
*Assistant Examiner* — Christopher R Buchanan
(74) *Attorney, Agent, or Firm* — Price Heneveld LLP

(57) ABSTRACT

A refrigerating appliance includes a cabinet having an inner liner that defines at least one aperture for accessing a refrigerating compartment. A door is operably coupled to the cabinet and is operable between open and closed positions. A plurality of storage surfaces is positioned within the refrigerating compartment. Each storage surface is adapted to receive at least one temporarily stored item. A scanning apparatus is adapted to record data related to the storage surfaces and the at least one temporarily stored item. The scanning apparatus conducts first and second data capturing phases. The secondary data recorded during the second data capturing phase is compared against previous data recorded during the first data capturing phase to create a current inventory manifest. The current inventory manifest is compared with a set of predetermined parameters related to the at least one temporarily stored item to selectively provide an output.

17 Claims, 17 Drawing Sheets

Related U.S. Application Data

(60) Provisional application No. 62/201,328, filed on Aug. 5, 2015.

(51) Int. Cl.
  *G06Q 30/06* (2012.01)
  *G06K 9/62* (2022.01)

(52) U.S. Cl.
  CPC ..... *G06Q 30/0633* (2013.01); *F25D 2500/06* (2013.01); *F25D 2700/04* (2013.01); *F25D 2700/08* (2013.01)

(56) References Cited

U.S. PATENT DOCUMENTS

| | | | |
|---|---|---|---|
| 7,878,344 B2 | 2/2011 | Martin et al. | |
| 7,938,280 B2 | 5/2011 | Dunn | |
| 9,033,438 B2 | 5/2015 | Kelly et al. | |
| 9,205,886 B1* | 12/2015 | Hickman | G05D 1/0246 |
| 9,230,250 B1* | 1/2016 | Parker | G06Q 30/0185 |
| 9,495,851 B1* | 11/2016 | Russell | G06K 19/07798 |
| 9,934,483 B1* | 4/2018 | Sangani | B65G 1/1378 |
| 9,984,354 B1* | 5/2018 | Chinoy | H04N 5/232 |
| 10,001,402 B1* | 6/2018 | Gyori | G01G 21/22 |
| 10,064,502 B1* | 9/2018 | Gyori | H04W 4/80 |
| 10,282,696 B1* | 5/2019 | Bettis | G06Q 10/087 |
| 10,365,671 B1* | 7/2019 | Nelson | G06Q 10/087 |
| 2003/0151339 A1 | 8/2003 | Reed et al. | |
| 2004/0100380 A1 | 5/2004 | Lindsay et al. | |
| 2007/0043600 A1* | 2/2007 | Solomon | A47B 63/067 705/28 |
| 2007/0192910 A1 | 8/2007 | Vu et al. | |
| 2007/0250410 A1* | 10/2007 | Brignone | G06Q 10/087 705/28 |
| 2007/0268138 A1* | 11/2007 | Chung | G06Q 10/087 340/572.1 |
| 2013/0138656 A1 | 5/2013 | Wheaton | |
| 2014/0042886 A1 | 2/2014 | Baldo | |
| 2014/0095479 A1 | 4/2014 | Chang et al. | |
| 2014/0148947 A1* | 5/2014 | Levesque | G07F 9/026 700/237 |
| 2014/0175037 A1 | 6/2014 | Dart et al. | |
| 2014/0316916 A1 | 10/2014 | Hay | |
| 2015/0068999 A1 | 3/2015 | Dart et al. | |
| 2015/0149298 A1 | 5/2015 | Tapley | |
| 2015/0154675 A1* | 6/2015 | Todasco | G06Q 30/0613 705/26.41 |
| 2016/0057394 A1 | 2/2016 | Marutani et al. | |
| 2016/0123657 A1 | 5/2016 | Kim et al. | |
| 2016/0203591 A1 | 7/2016 | Justaniah et al. | |
| 2016/0258670 A1 | 9/2016 | Deka et al. | |
| 2016/0350704 A1* | 12/2016 | Minvielle | G06Q 10/087 |
| 2016/0350715 A1* | 12/2016 | Minvielle | G01N 33/02 |

FOREIGN PATENT DOCUMENTS

| | | |
|---|---|---|
| EP | 2975342 | 1/2016 |
| GB | 2507929 | 5/2014 |
| JP | 0849958 | 2/1996 |
| JP | 2796815 | 10/2014 |
| JP | 2014209052 | 11/2014 |
| JP | 2015072109 | 4/2015 |
| JP | 2015135206 | 7/2015 |
| WO | 2014016212 | 1/2014 |
| WO | 2014142120 | 9/2014 |
| WO | 2014198612 | 12/2014 |

* cited by examiner

OBJECT RECOGNITION SYSTEM FOR AN APPLIANCE AND METHOD FOR MANAGING HOUSEHOLD INVENTORY OF CONSUMABLES

CROSS-REFERENCE TO RELATED APPLICATION

The present application is a continuation of U.S. patent application Ser. No. 15/198,258, filed Jun. 30, 2016, now U.S.Pat. No. 10,474,987, entitled OBJECT RECOGNITION SYSTEM FOR AN APPLIANCE AND METHOD FOR MANAGING HOUSEHOLD INVENTORY OF CONSUMABLES, which claims priority to and the benefit under 35 U.S.C. § 119(e) of U.S. Provisional Patent Application No. 62/201,328, filed on Aug. 5, 2015, entitled OBJECT RECOGNITION SYSTEM FOR AN APPLIANCE AND METHOD FOR MANAGING HOUSEHOLD INVENTORY OF CONSUMABLES, the entire disclosures of which are hereby incorporated herein by reference.

FIELD OF THE DISCLOSURE

This application relates to household appliances, and more typically a refrigerating appliance. In particular, the appliance disclosed herein incorporates a system that captures successive inputs of data and analyzes and compares the captured data or portion of the data to provide an indication to the user of the appliance about the status of the household inventory of various consumable products.

SUMMARY OF THE DISCLOSURE

In at least one aspect of the disclosure, a refrigerating appliance includes a cabinet having an inner liner that defines at least one cabinet aperture for accessing a corresponding refrigerating compartment, at least one door operably coupled to the cabinet and operable between open and closed positions, the open position defined by the refrigerating compartment being accessible through at least one cabinet aperture, and the closed position being defined by the door engaging at least a portion of at least one aperture. A plurality of storage surfaces is positioned within the refrigerating compartment, each of the plurality storage surfaces adapted to receive at least one temporarily stored item. One or more scanning apparatus is adapted to record data related to the plurality of storage surfaces and at least one temporarily stored item. One or more scanning apparatus conducts first and second data capturing phases. The secondary data is recorded during the second data capturing phase is analyzed and compared against previous data recorded during the first data capturing phase to create a current inventory manifest. The current inventory manifest is compared with a set of predetermined parameters related to the at least one temporarily stored item to selectively provide an output.

In at least another aspect, an appliance includes a cabinet having an interior compartment, wherein the cabinet defines at least one corresponding aperture for accessing the interior compartment. At least one door panel is coupled to the cabinet and operable between open and closed positions. A storage area is defined within the interior compartment, the storage area adapted to receive at least one temporarily stored item. A scanning apparatus is adapted to record data related to the storage area and the at least one temporarily stored item. The scanning apparatus conducts first and second data capturing phases, and secondary data recorded during the second data capturing phase is compared against previous data recorded during the first data capturing phase to create a current inventory manifest. The current inventory manifest is compared with a set of predetermined parameters related to the at least one temporarily stored item to selectively provide an output.

In at least another aspect, an object recognition system for an appliance includes a plurality of storage surfaces positioned within a storage area, each of the plurality storage surfaces adapted to receive at least one temporarily stored item. A scanning apparatus is adapted to record data related to the plurality of storage surfaces and the at least one temporarily stored item, wherein the scanning apparatus conducts first and second data capturing phases. Secondary data is recorded during the second data capturing phase is compared against previous data recorded during the first data capturing phase to create a current inventory manifest. The current inventory manifest is compared with a set of predetermined parameters related to the at least one temporarily stored item to selectively provide an output related to at least one temporarily stored item.

These and other features, advantages, and objects of the present device will be further understood and appreciated by those skilled in the art by reference to the following specification, claims, and appended drawings.

BRIEF DESCRIPTION OF THE DRAWINGS

The foregoing summary, as well as the following detailed description of the device, will be better understood when read in conjunction with the appended drawings. For the purpose of illustrating the device, there are shown in the drawings, certain embodiment(s) which are presently preferred. It should be understood, however, that the device is not limited to the precise arrangements and instrumentalities shown. Drawings are not necessary to scale. Certain features of the device may be exaggerated in scale or shown in schematic form in the interest of clarity and conciseness.

DETAILED DESCRIPTION

Before the subject device is described further, it is to be understood that the device is not limited to the particular embodiments of the device described below, as variations of the particular embodiments may be made and still fall within the scope of the appended claims. It is also to be understood that the terminology employed is for the purpose of describing particular embodiments or aspects of embodiments, and is not intended to be limiting. Instead, the scope of the present device will be established by the appended claims.

Where a range of values is provided, it is understood that each intervening value, to the tenth of the unit of the lower limit unless the context clearly dictates otherwise, between the upper and lower limit of that range, and any other stated or intervening value in that stated range, is encompassed within the device. The upper and lower limits of these smaller ranges may independently be included in the smaller ranges, and are also encompassed within the device, subject to any specifically excluded limit in the stated range. Where the stated range includes one or both of the limits, ranges excluding either or both of those included limits are also included in the device.

In this specification and the appended claims, the singular forms "a," "an" and "the" include plural reference unless the context clearly dictates otherwise.

Figure 1:
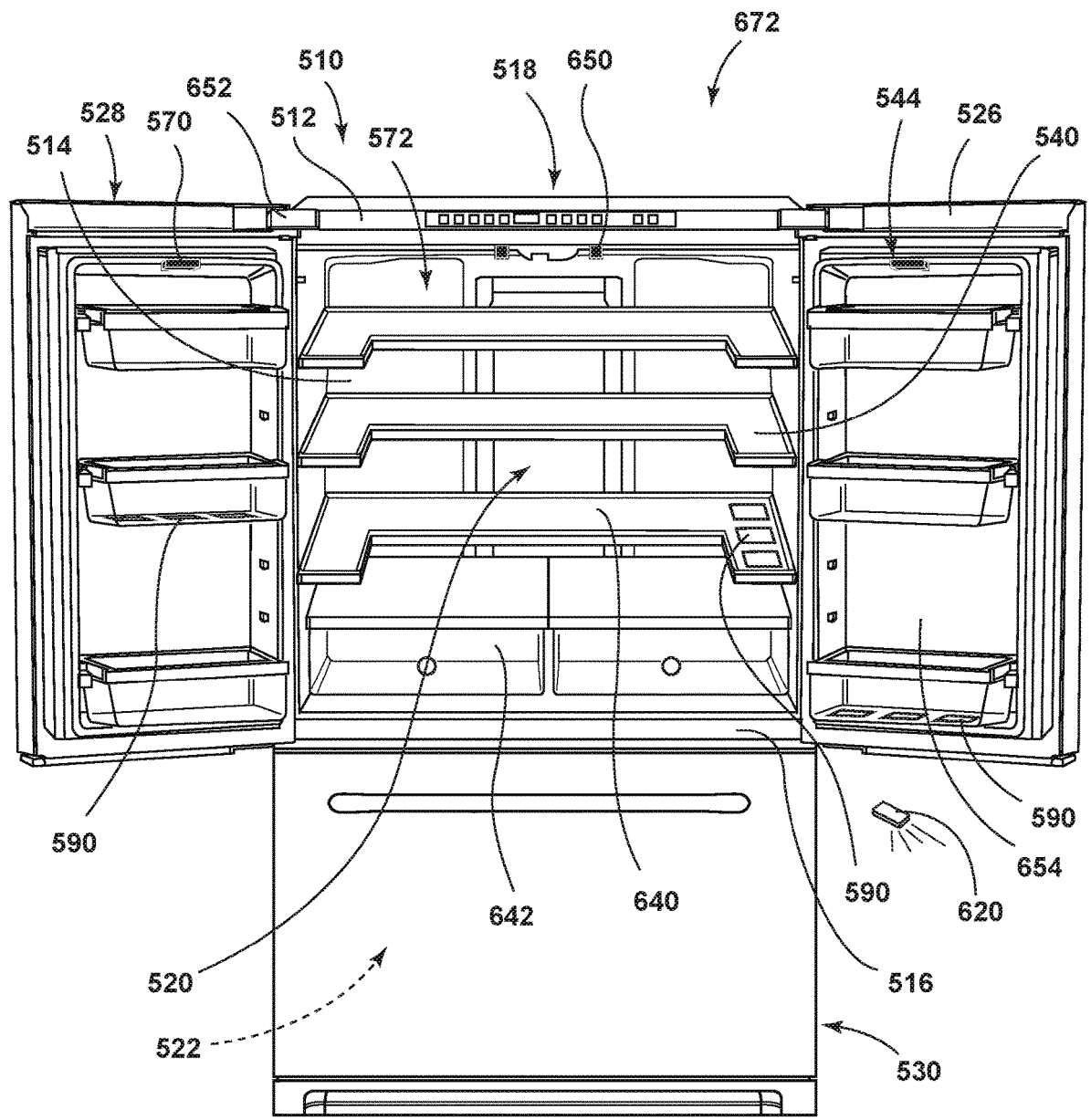
FIG. 1 is a front perspective view of a French door bottom mount (FDBM) refrigerator with the refrigerator compartment doors open and illustrating various exemplary aspects of a scanning apparatus for the object recognition system.
Figure 2:
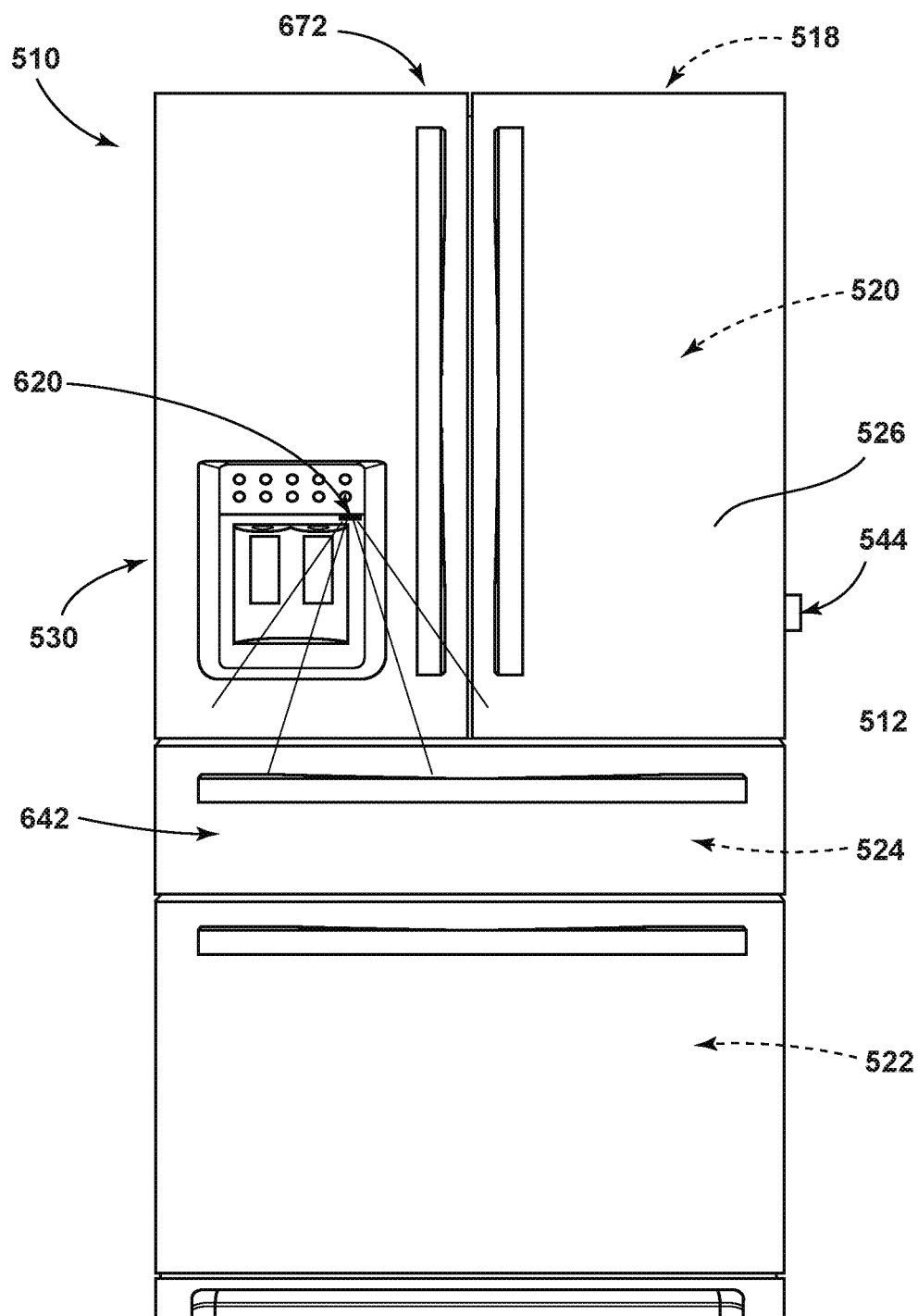
FIG. 2 is a front elevational view of a refrigerating appliance incorporating various exemplary external aspects of a scanning apparatus for the object recognition system.
Figure 3:
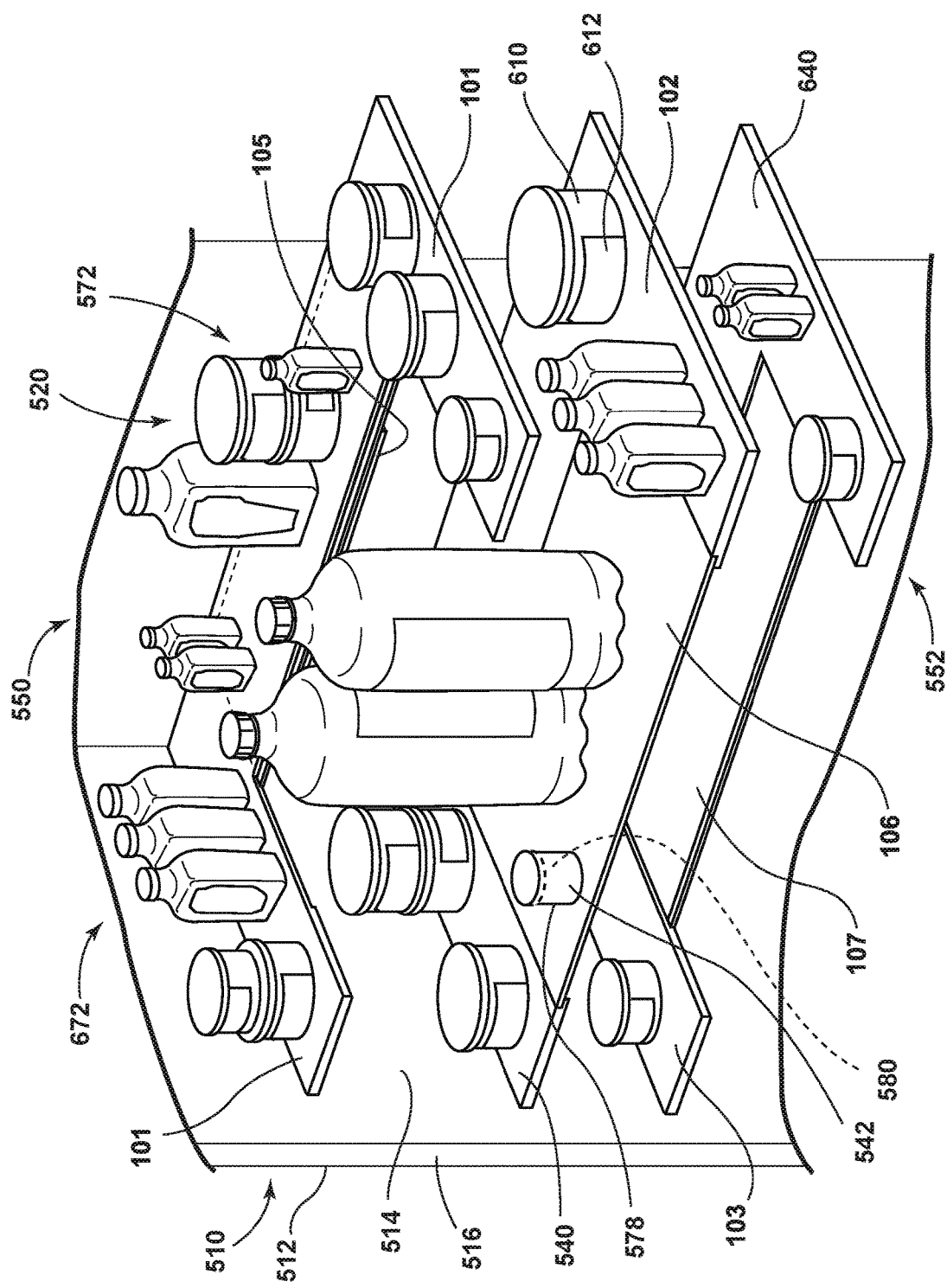
FIG. 3 is a perspective view of an interior of an exemplary refrigerating appliance incorporating various temporarily stored items in a first position during a first data capturing phase.
Figure 4:
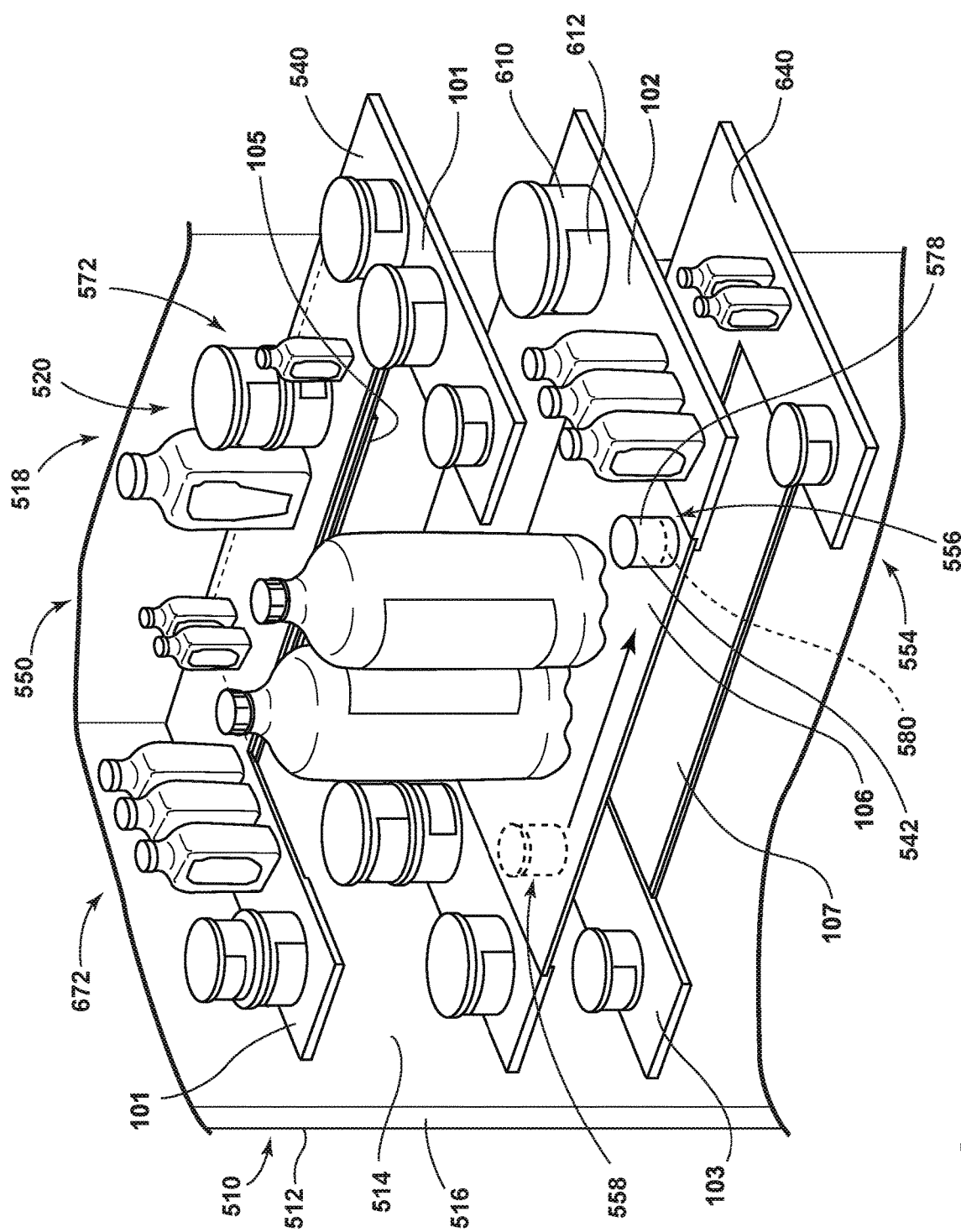
FIG. 4 is a perspective view of the exemplary appliance of FIG. 3 with the temporarily stored items in a second position during a second data capturing phase.
Figure 5:
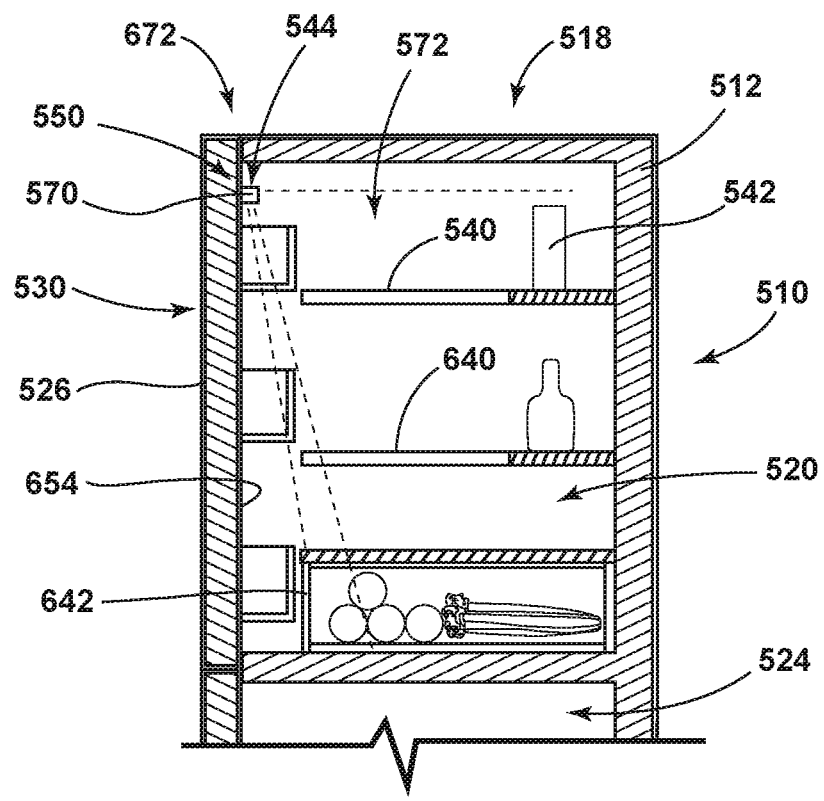
FIG. 5 is a cross-sectional view of the refrigerating appliance of FIG. 2 illustrating an exemplary data scanning phase of temporarily stored items within a refrigerating compartment.

Referring to an aspect of the various embodiments illustrated in FIGS. 1 and 2, reference numeral 510 generally refers to a household appliance, typically a refrigerating appliance. The appliance 510 can include a cabinet 512 having an inner liner 514 that defines at least one aperture 516 for accessing a corresponding refrigerating compartment 518. The refrigerating compartment 518 can be a refrigerated compartment 520, freezer compartment 522, warmer, crisper, pantry compartment 524, combinations thereof, and other similar compartments found within a refrigerating appliance 510. At least one door 526 is operably coupled to the cabinet 512 and is operable between open and closed positions 528, 530. It is contemplated that the open position 528 is defined by the refrigerating compartment 518 being accessible through the at least one aperture 516. In the case of a French door refrigerator, the open position 528 can be defined by one of the French doors 526 being open and one of the French doors 526 being closed. The closed position 530 is defined by the door 526 engaging at least a portion of the at least one aperture 516, such that either the refrigerating compartment 518 is inaccessible or only partially accessible. While discussed and described in the context of a French door bottom mount (FDBM) configuration appliance, the present disclosure may be applied to other configurations including a dual pantry drawer, side-by-side, top mount freezer, and four-door configuration, for example.

Referring now to FIGS. 1-9, a plurality of storage surfaces 540 can be positioned within one or a plurality of refrigerating compartments 518, where each of the plurality of storage surfaces 540 within the refrigerating compartment 518 is adapted to receive at least one temporarily stored item 542, which is typically a food or beverage container or a food item. Examples of such temporarily stored items 542 can be food items, condiments, produce, meats, frozen items, spices, baking needs, beverages and other similar consumable or perishable items generally stored within a household appliance 510. The appliance 510 can include a scanning apparatus 544 that is adapted to record data related to the plurality of storage surfaces 540 and the various temporarily stored item or items 542 placed thereon. In this manner, the scanning apparatus 544 is configured to conduct various data capturing phases 550, including first and second data capturing phases 552, 554. The data capturing phases 550 can be performed to record, obtain, scan, read, measure, view, input, transfer, sequester or otherwise capture data through the use of the scanning apparatus 544. According to the various embodiments, secondary data 556 recorded during the second data capturing phase 554 can be analyzed and compared against previous data 558 recorded during the first data capturing phase 550 to create a current inventory manifest 560. This current inventory manifest 560 can be compared with a set of predetermined parameters 562 related to the at least one temporarily stored item 542. When the current inventory manifest 560 is compared against the predetermined parameters 562 that are related to the at least one temporarily stored item 542, a processor 670 for the appliance 510 generates an output such as in the form of an indicia transmitted to a user that can correspond to any one or more of the at least one temporarily stored item 542. The predetermined parameters 562 can relate to user preferences as to quantity, quality, life span, spoilage, and other information related to the various temporarily stored items 542 or combinations of parameters, including, but not limited to, the parameters discussed above.

Figure 16:
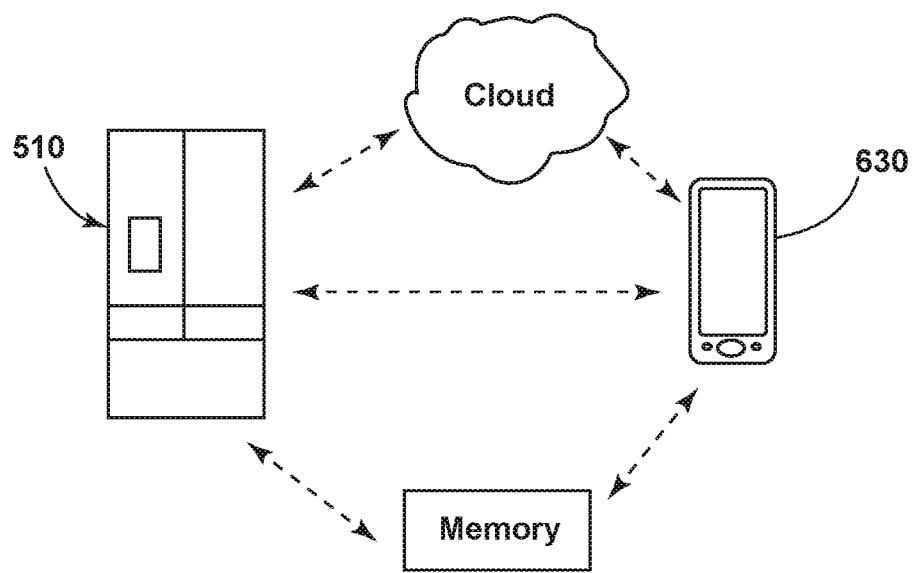
FIG. 16 is a schematic diagram illustrating an aspect of the object recognition system for providing communication between an appliance utilizing the object recognition system and a personal computing device that can communicate with information gathered by the object recognition system.
Figure 17:
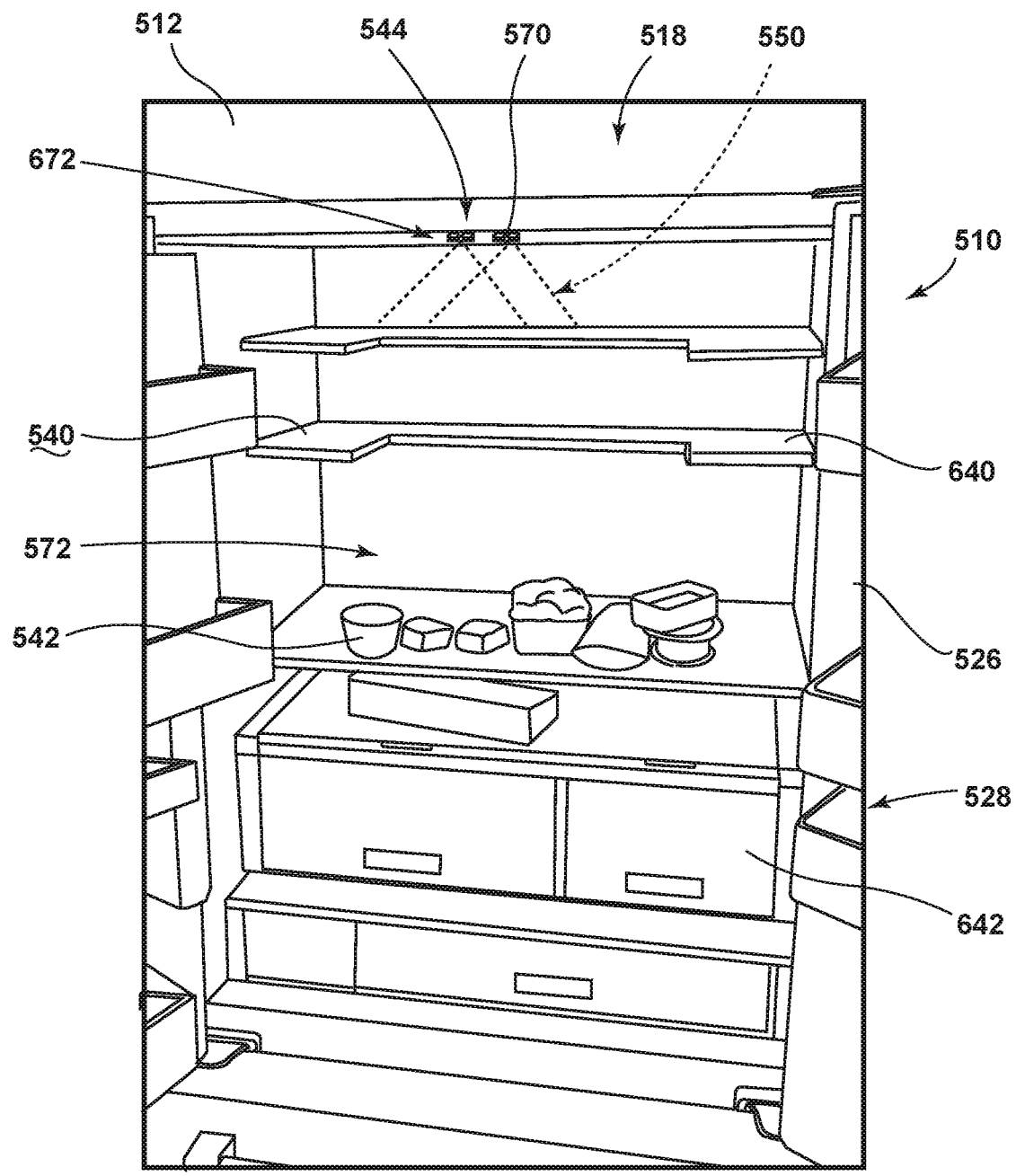
FIG. 17 is a front perspective view of an appliance incorporating an aspect of the scanning apparatus and illustrating an exemplary aspect of the scanning apparatus.
Figure 18:
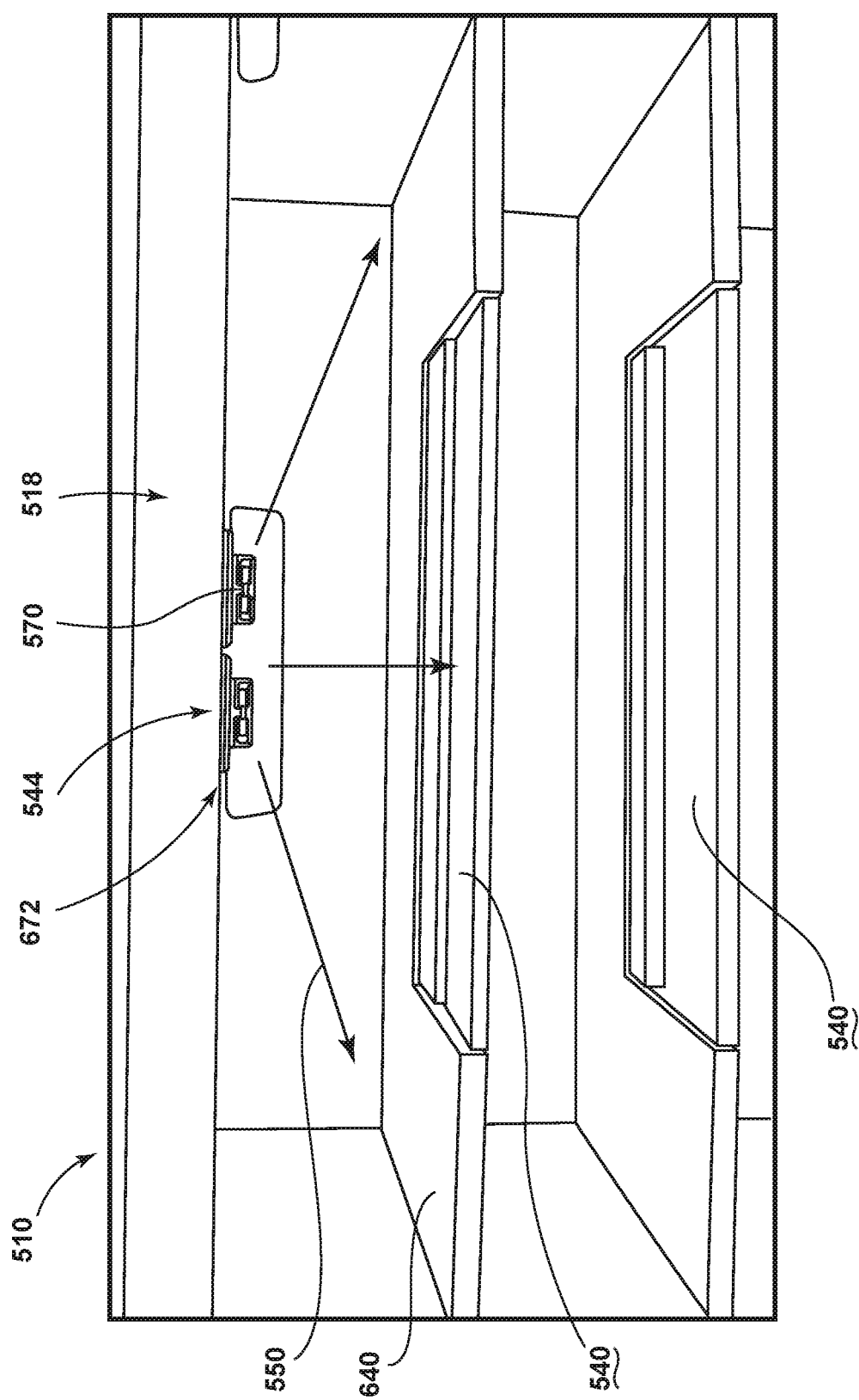
FIG. 18 is a front perspective view of an appliance incorporating an aspect of the scanning apparatus and illustrating an exemplary aspect of the scanning apparatus and further illustrating a U-shaped tuck shelf system in an untucked configuration.
Figure 19:
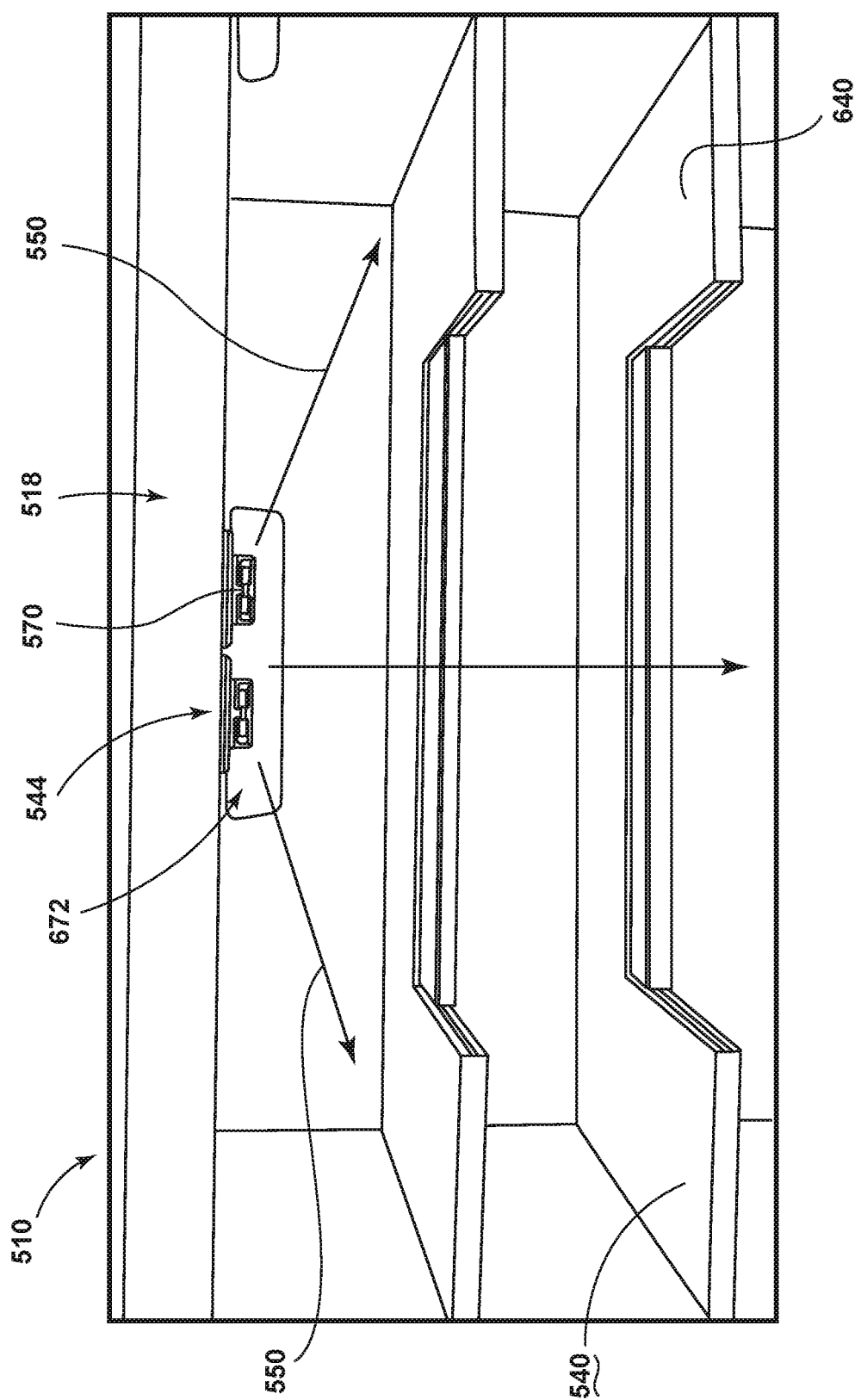
FIG. 19 is a front perspective view of an appliance incorporating an aspect of the scanning apparatus and illustrating an exemplary aspect of the scanning apparatus and further illustrating a U-shaped tuck shelf system in a tucked configuration.
Figure 20:
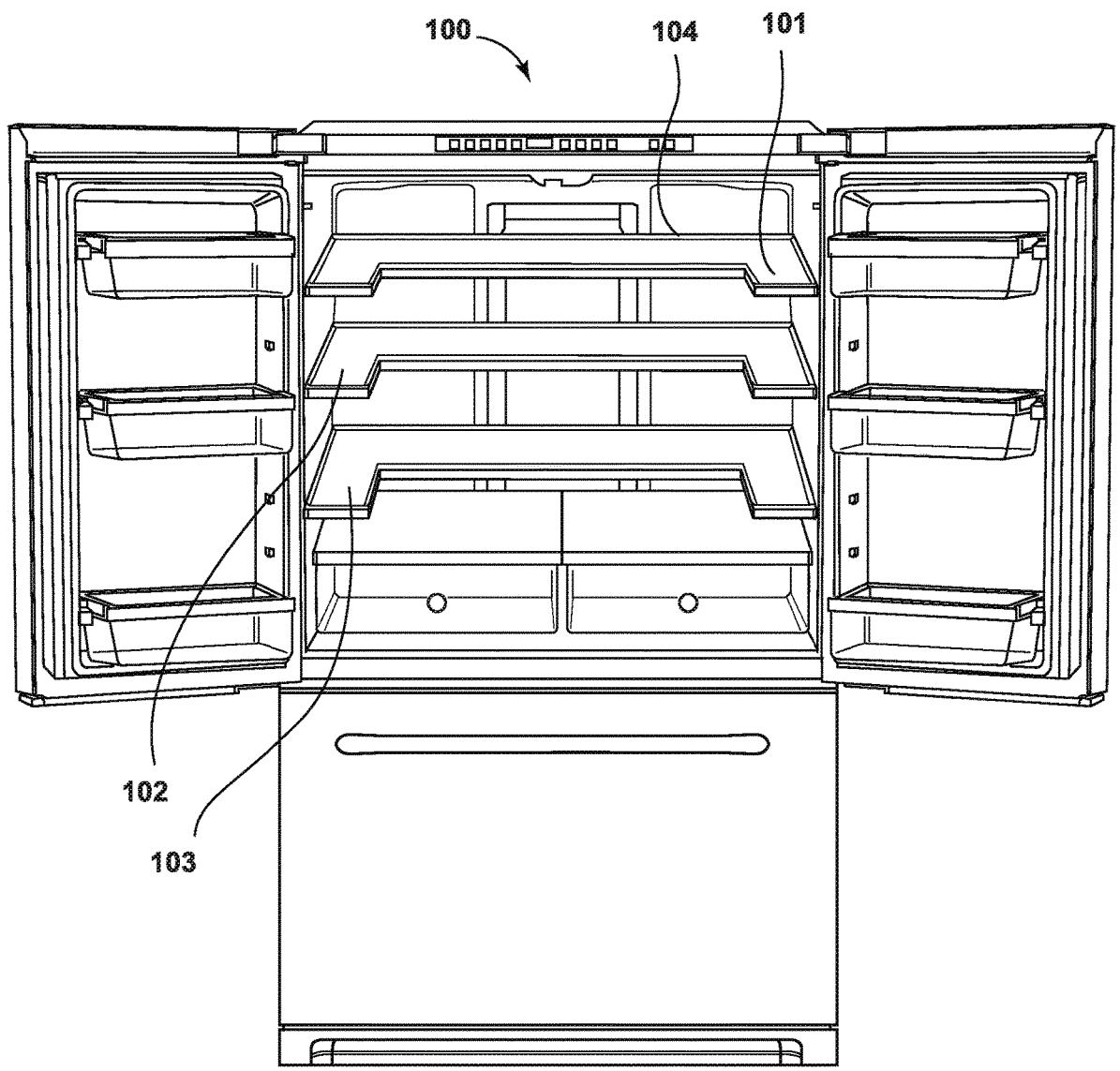
FIG. 20 is a front perspective view of a FDBM refrigerator with the refrigerator compartment doors open and bottom freezer compartment door closed.

It is contemplated that the processor 670 can be located within a portion of the appliance 510. It is also contemplated that the processor 670 can be a "cloud" based computing system positioned remote from the appliance 510 (shown in FIG. 16).

According to the various embodiments, as exemplified in FIGS. 1-8 and 17-19, the scanning apparatus 544 can include a plurality of cameras 570 disposed within the refrigerating compartment 518 of the appliance 510. The cameras 570 can be configured to periodically scan each of the plurality of storage surfaces 540, as well as the at least one temporarily stored item 542 disposed within any one or more of the plurality of storage surfaces 540. In this manner, during the first and second data capturing phases 552, 554, the scanning apparatus 544 can record a photograph, or other type of image, of the interior 572 of the refrigerating compartment 518, and/or can record the data using alternate imaging methods that can include, but are not limited to, infrared imaging, 3-D imaging, light-field imaging, thermal imaging, digitized imaging, combinations thereof, and any other type of imaging method that can collect data as to the various properties and configurations of the plurality of storage surfaces 540 and the at least one temporarily stored item 542 disposed within.

According to various aspects of the device, as illustrated in FIGS. 1-16, it is contemplated that the current inventory manifest 560 generated through data recorded during the first and second data capturing phases 552, 554 can be implemented in numerous methods for assisting the user in maintaining the household inventory of items, both within the appliance 510 and throughout various portions of the house, as will be described more fully below.

The scanning apparatus 544 can include at least one or more cameras 570. The camera(s) 570 can be adapted to record the contents of the refrigerating compartment 518, such as the at least one temporarily stored item 542 being disposed within one or more of the plurality of storage surfaces 540. The camera(s) 570 also can be adapted to record the contents of at least one of the one or more temporarily stored items 542. By way of example, and not limitation, the scanning apparatus 544 can record the position of a substantially transparent milk container 578 (or other similar at least partially translucent, translucent or transparent container) disposed within the refrigerating compartment 518. Additionally, the scanning apparatus 544 can capture or read information regarding the amount of milk contained within the translucent milk carton. In this manner, during the first data capturing phase 552, the scanning apparatus 544 will record or read the positioning of each of the temporarily stored items 542 as well as the remaining contents 580 contained therein.

During the second data capturing phase 554, a substantially similar scan is taken of the interior 572 of the refrigerating compartment 518 to gather updated data concerning the contents of the refrigerating compartment 518. The data obtained through the first and second data obtaining, more typically, data recording phases 552, 554 is compared, and the differences in the two images or data sets are analyzed to determine changes in the location of the plurality of storage surfaces 540, removal of one or more of the storage surfaces 540, changes in the location of one or more of the temporarily stored items 542, removal of one or more of the temporarily stored items 542, the changes in the remaining contents 580 of one or more of the temporarily stored items 542, changes in the physical appearance of one or more of the temporarily stored items 542, combinations thereof, and other similar comparative information that can be derived through a comparison of data obtained during the first and second data capturing phases 552, 554. As discussed above, the analysis and comparison of the first and second data capturing, typically recording, phases 552, 554 produces the current inventory manifest 560 of the appliance 510 that corresponds to the current configuration and contents of the refrigerating appliance 510, and also changes as to the contents of the refrigerating appliance 510 since performance of the first data capturing phase 552.

According to various embodiments, it is contemplated that a set of data captured during a particular data capturing phase 550 may not be compared with another data set. In such an embodiment, the data capturing phase 550 can record a current state of the contents of the appliance 510.

According to the various embodiments, the scanning apparatus 544 having cameras 570 may be limited for purposes of determining the contents of temporarily stored items 542 that may have an opaque or only slightly translucent outer covering, such as an opaque plastic container 578 of mustard, or a cardboard container 578 of milk. In such a situation, a photographic image may not be sufficient or completely sufficient to determine the status of the contents of the temporarily stored item 542. Accordingly, the scanning apparatus 544 can also include various scales 590 or systems to weigh items disposed within portions of the plurality of storage surfaces 540 that can measure the remaining contents 580 of a particular container 578, based upon observed changes in the weight of the temporarily stored item 542.

According to the various embodiments, the scales 590 and cameras 570 can work in conjunction, such that the cameras 570 can determine the location of a particular temporarily stored item 542, and the scales 590, where the container 578 is substantially opaque, can determine the contents remaining within the container 578 for the temporarily stored item 542. Other imaging systems that may be able to obtain the amount of a food or beverage in an opaque container such as a thermal imaging camera or ultrasound system(s) can also be incorporated into the scanning apparatus 544.

According to various aspects of the device, as illustrated in FIGS. 3-8, it is contemplated that the first and second data capturing or recording phases 552, 554 can be undertaken at various times during the use of the appliance 510. According to at least one aspect, when the door of the appliance 510 is moved to a closed position 530, the scanning apparatus 544 can be engaged to conduct a data capturing phase, typically a recording phase 550. In this manner, after a user of the appliance 510 is done viewing, removing, using, disposing, replacing and/or otherwise manipulating the various temporarily stored items 542, such as during preparation of meals, the user will close the door and the scanning apparatus 544 conducts the data capturing phase 550. In this manner, the first data capturing phase 552 is conducted during a movement of the door 526, and the second data capturing phase 554 is conducted during a subsequent movement of the door 526. Accordingly, after the user is done manipulating the various temporarily stored items 542 within the appliance 510, the data capturing phase 550 can be undertaken and the various analyses and comparative computations can be made, typically by one or more computer or server systems, to derive the current inventory manifest 560 of the appliance 510. It is also contemplated that the scanning apparatus 544 can be activated to perform a data capturing phase 550 at certain times of the day, or during certain time intervals.

In embodiments where the scanning apparatus 544 is engaged when the door 526 is moved to the closed position 530, it is contemplated that the scanning apparatus 544 may not be activated until a certain amount of time has passed after the door 526 has closed. When a user is accessing the refrigerating appliance 510, the user often opens and closes the door 526 of the appliance 510 repeatedly to access multiple temporarily stored items 542 within the refrigerating compartment 518. The scanning apparatus 544 can be configured to wait a predetermined amount of time along the order of seconds, minutes, 15 minutes, 30 minutes, or more, before activating the next data capturing phase 550. This delay in the activation of the scanning apparatus 544 can help to insure that the user is likely done manipulating the various temporarily stored items 542 with respect to a particular meal, so that an accurate, or substantially accurate, current inventory manifest 560 can be derived. It is contemplated that a delay in the scanning apparatus 544 can be useful where certain items may take various amounts of time to settle or find their level. Such viscous items such as mayonnaise, mustard, syrup and other similar viscous items may stick to the sides of the respective container 578, such that an accurate visual estimation of the remaining contents 580 of the container 578 can be difficult, until such time as the contents of the container 578 has settled and found its level.

It is contemplated that the object recognition system 672 that includes the scanning apparatus 544 can perform a data capturing phase 550 when the doors 526 are in the closed position 530. In this manner, lighting within the interior 572 of the appliance 510 can be activated so that the one or more data capturing phases 550 can be conducted. The lighting can be the general lighting for the interior 572 of the appliance 510. Dedicated lighting can also be included that is configured to work in conjunction with the scanning apparatus 544 to best illuminate the interior 572 and the temporarily stored items 542.

It is also contemplated that the scanning apparatus 544 can be activated when the door 526 is moved to the closed position 530, without a substantial delay in any respect. In this manner, substantially real-time information can be delivered to the user in the form of an up-to-date current inventory manifest 560 of the appliance 510. Accordingly, information concerning the temporarily stored items 542 within the appliance 510 can be delivered as the various temporarily stored items 542 are used.

According to the various embodiments, the scanning apparatus 544 can also include a manual or at least semi-automated input function where certain items that may not be recognized by visual scanning or weight scanning can be input. Such items can include food items (i.e., leftovers stored within a substantially opaque or translucent storage container 610) or other similar items that may not be visually discernable. In such an instance, the scanning apparatus 544 can notify the user of an unidentifiable item and may prompt the user for manual input concerning the remaining contents 580 thereof. It is also contemplated that various storage containers 610 can include identifier tags 612 that work in conjunction with the scanning apparatus 544 where such tags 612 can be relate to various information concerning the contents of the storage container 610.

By way of example, and not limitation, after a particular food item is done being prepared and is ready for storage within the refrigerated appliance 510, the user can input a certain tag 612 or attach a certain tag 612 onto the storage container 610. Various identifying tags 612 can be useful in a situation where a number of storage containers 610 having a similar appearance are contained within the refrigerated compartment 520. The identifier tags 612 can be attached to the opaque storage containers 610 such that each storage container 610 can be tracked as it is stored within the refrigerating appliance 510. Accordingly, one storage container 610 having a vegetable stored therein and another similarly shaped opaque storage container 610 containing a meat can be tracked as each storage container 610 is moved or shifted within the refrigerating appliance 510 during use of the appliance 510. The manual input can be performed by various manual input mechanisms that can include, but are not limited to, key pads, voice recognition devices, hand scanners, selection menus, query-based inputs, combinations thereof, and other similar input devices.

According to various embodiments, as exemplified in FIGS. 1 and 2, it is contemplated that the scanning apparatus 544 of the appliance 510 can also include an exterior scanner 620 that can be disposed on or within a portion of the appliance 510 or a hand held scanner that can be used to manually scan temporarily stored items 542 that are to be stored within or outside of the refrigerating compartment 518. This hand scanner 620 can be a wireless scanner, corded scanner, or can be integrated within a portable computing device 630 (shown in FIG. 16), such as a cell phone, tablet, wearable computing device, or other similar portable computing device 630 that the user can implement to scan temporarily stored items 542, or scan other items related to a household inventory of consumable and perishable items, as will be described more fully below. The portable computing device 630 can include a non-transitory computer readable medium that stores one or more programs and the graphical user interface on a computing device with a touch screen display, a memory, and one or more processors to execute one or more programs stored in the memory, wherein the touch screen device is operatively connected to one or more database servers via a wired or wireless network of the present invention.

According to the various embodiments, as exemplified in FIGS. 1, 2, 5-7 and 17-19, the scanning apparatus 544 can include one or more cameras 570 that are strategically located on the doors 526 of the refrigerated compartment 520 or on the cabinet 512 of the refrigerated compartment 520. The cameras 570 can be oriented to face the inside of the appliance 510 when the door 526 is in a closed position 530. In this manner, when the doors 526 are in the closed position 530, the cameras 570 can view the contents of the shelves 640 disposed within the interior 572 of the refrigerated compartment 520. It is contemplated that cameras 570 may only be disposed on the doors 526 such that when the doors 526 are closed, the cameras 570 are specifically and synergistically positioned, to be able to capture views of most, if not all, of the temporarily stored items 542 contained within the refrigerating appliance 510. It is also contemplated that the configuration of the shelves 640 can assist in capturing images of the temporarily stored items 542 to get an accurate picture of the current inventory manifest 560. Such shelf configurations can include a U-shaped shelf 640 where items disposed in the various shelves 640 are generally not more than a few inches away from an outer edge of the shelf 640 in a pantry-like configuration within the refrigerating compartment 518. In this manner, each of the temporarily stored items 542 contained within the refrigerating compartment 518 are substantially visible by the various cameras 570 of the scanning apparatus 544 for viewing contents of the refrigerating compartment 518, as well as the positioning of the plurality of storage surfaces 540 and the positioning, contents, and status of the temporarily stored items 542.

Referring to FIGS. 5, 7, 17, 18 and 19-23, to further assist capturing data during the first and second data capturing phases 552, 554, the shelves 640 can also include clear storage surfaces 540 such that a camera disposed on the door 526 can view through a transparent shelf 640 at a particular temporarily stored item 542 disposed below the transparent shelf 640. According to various aspects of the device, it is contemplated that numerous shelf configurations can be included within the refrigerated compartment 520. Such shelf configurations can include, but are not limited to, U-shaped shelves, narrow-profile shelves, staggered-height shelves, rectangular shelves, height-adjustable shelves, shelves having slidable partitions, transparent shelves, translucent shelves, at least partially translucent shelves, opaque shelves, shelves having integrated lighting, combinations thereof, and other similar configurations for allowing a camera to capture data and/or images as to all or substantially all of the temporarily stored items 542 contained within the refrigerating compartment 518. It is further contemplated that the cameras 570 and/or the shelves 640 can be operable in a variety of directions (i.e., vertically, horizontally, laterally, diagonally, arcuately, irregularly, etc.) in order to provide a wide range of views for performing the first and second data capturing phases 552, 554 to accurately gather information as to the temporarily stored items 542 to generate the current inventory manifest 560.

Referring again to FIGS. 5 and 7, it is also contemplated that various drawers 642 contained within the refrigerating compartment 518 can include transparent or at least partially transparent materials such that a camera 570 of the scanning apparatus 544 can view items contained within various drawers 642 of the appliance 510. Such drawers 642 can include, but are not limited to, crisper drawers, pantry drawers, drawers for humidity-controlled compartments, heating compartments, warmers, and other similar drawers 642 of the appliance 510. The various data capturing phases 550 for drawers 642 of an appliance 510 can be conducted as the drawer 642 is moved between a closed position 530 and an open position 528 where the drawer 642 is extended from the refrigerating compartment 518.

In order to capture images of all of the various compartments of the appliance 510, it is contemplated that various cameras 570 can be disposed throughout the appliance 510 for capturing and analyzing data and performing the first and second data capturing phases 552, 554 within each of the compartments. Such compartments can include, but are not limited to, refrigerated compartments 520, pantry compartments 524, freezer compartments 522, heaters, warmers, and other similar compartments.

It is contemplated that each compartment can contain its own scanning apparatus 544 that can be modified for the most efficient use within each of the particular compartments. By way of example, and not limitation, the scanning device disposed within a freezer compartment 522 may be different than a scanning device disposed within a pantry compartment 524, warmer, or refrigerated compartment 520 based upon different environment conditions within each compartment. It is also contemplated that a larger compartment, such as a refrigerated compartment 520, can include multiple cameras 570, where multiple cameras 570 may be better suited for capturing the locations of the temporarily stored items 542 through the entire refrigerated compartment 520. It is contemplated that the overall configuration of the scanning apparatus 544 can be specifically designed depending upon various factors relating to the particular appliance 510. Such factors can include, but are not limited to, the number of compartments contained within the appliance 510, the type of compartments, the size of compartments, the type of shelving within a compartment, the configuration of the shelving within a compartment, the shelving material, the number of doors 526 of the appliance 510, the number of drawers 642 of the appliance 510, combinations thereof and other similar factors. It is further contemplated that the scanning apparatus 544 can be modified after sale to accommodate the specific habits and patterns of the user. Such habits and patterns can include, but are not limited to, a desired temperature of a particular compartment, the number of times the compartment is accessed per day or per week, vacationing schedules, and other similar personal idiosyncrasies.

Referring again to FIGS. 1-7, where the scanning apparatus 544 includes cameras 570 disposed within a rotationally operable door 526, that is hingedly connected to the cabinet 512, it is contemplated that each door 526 of a French door refrigerator can be configured to take a picture of the opposing French door 526 as the doors 526 are moved to a fully open position 528. In this manner, the system can be configured to be capable of sensing the speed of each door 526 as each door 526 moves between the open and closed positions 528, 530. Such a sensing operation can be done through motion sensors 650, a rotational sensor disposed proximate a door hinge 652, or other similar movement sensing apparatus or combinations thereof.

The speed sensing process can also be done using a sensor 650 integrated into the camera or other portion of the scanning apparatus 544 to determine the best possible time to conduct a data scanning phase as to an opposing French door 526 of the appliance 510. Typically, where each of the French doors 526 is in a parallel configuration with respect to one another, and in an open position 528, the door interior 654 of each French door 526 faces the interior 572 of the opposing French door 526. In this manner, cameras 570 disposed on or within a portion of each door 526 can perform a data capturing phase 550 as to the opposing door interior 654 for gathering information related to the storage surfaces 540 of each door 526 as well as the temporarily stored items 542 disposed within each door 526. At the appropriate time after the doors 526 are moved to the closed position 530, all of the data recorded during the various data capturing phases 550 can be combined, analyzed and compared to determine a current inventory manifest 560 as to the entire appliance 510. It is also contemplated that more numerous scans can be conducted as to the door interiors 654 than as to the interior 572 of the refrigerated compartment 520. Such a configuration can be useful where the user of the appliance 510 accesses the door interiors 654 more than any other portion of the appliance 510. Such a configuration can be set during manufacture. This configuration can also be set by the user depending on the habits, patterns, and idiosyncrasies of the user of the appliance 510 allowing for more personalization of the user(s) based upon their preferences. While French doors 526 are discussed in this aspect of the device, it is contemplated that a side-by-side refrigerating appliance 510 can also include such an aspect, for capturing data related to the temporarily stored items 542 in each of the refrigerator and freezer doors 526.

Figure 6:
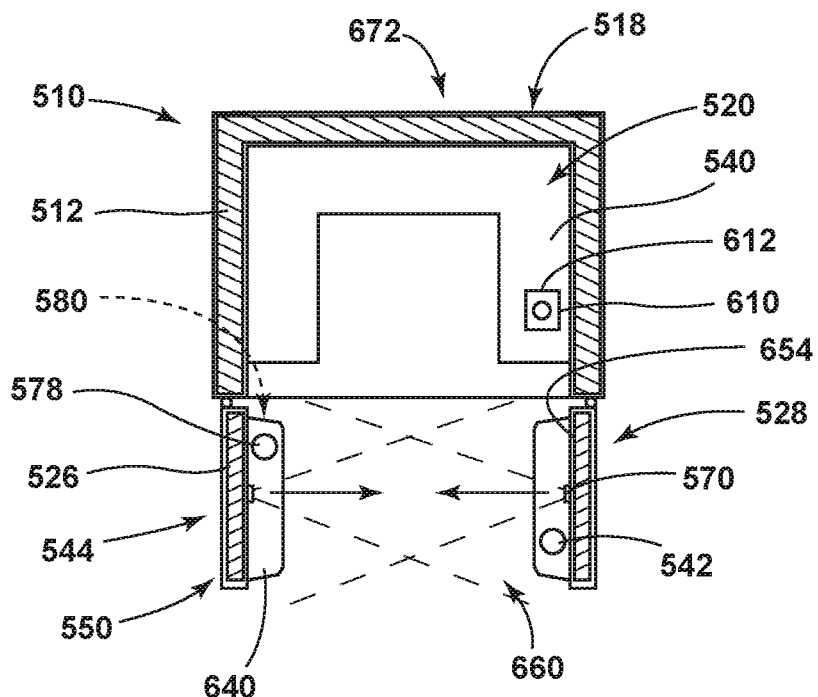
FIG. 6 is a lateral cross-sectional view of an exemplary refrigerating appliance with the doors in the open position and the scanning apparatus performing a data scanning phase of the interior surfaces of the opposing French doors.
Figure 7:
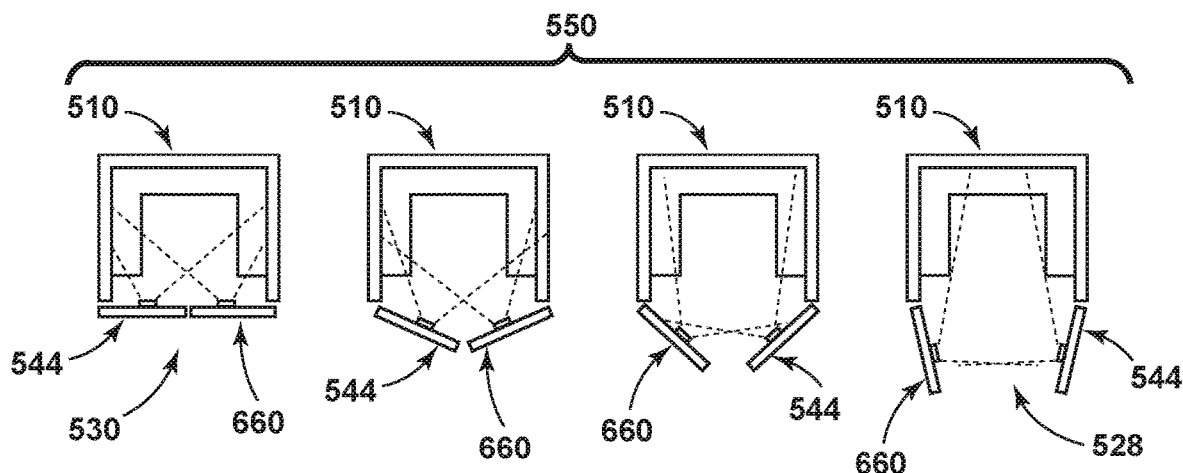
FIG. 7 is a series of cross-sectional views of an exemplary appliance illustrating the process of a data scanning phase as the doors are moved from a closed position to an open position in order to capture a three-dimensional image of the refrigerating compartment and the temporarily stored items.
Figure 8:
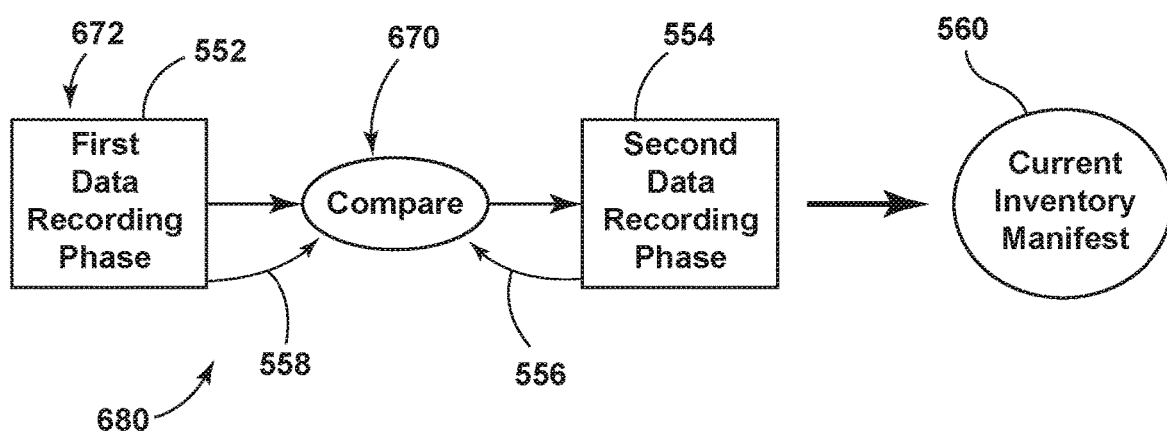
FIG. 8 is a linear flow diagram illustrating an exemplary process for capturing a current inventory manifest for the object recognition system.
Figure 9:
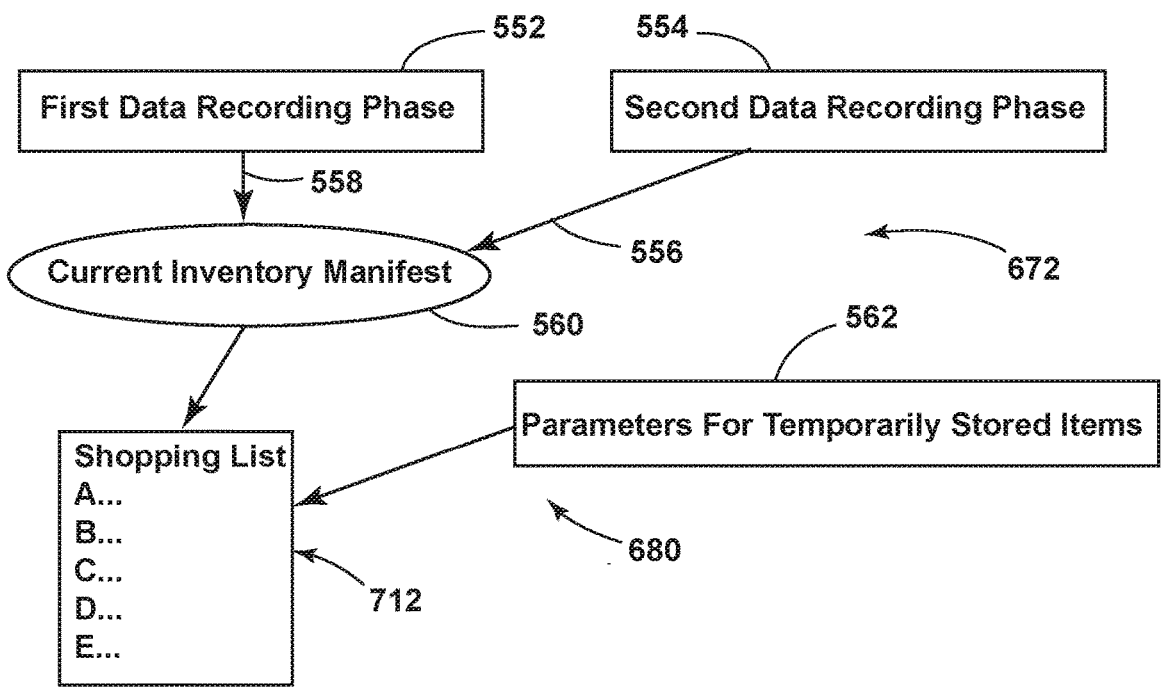
FIG. 9 is a flow diagram illustrating an exemplary process for formulating a shopping list for the object recognition system.
Figure 10:
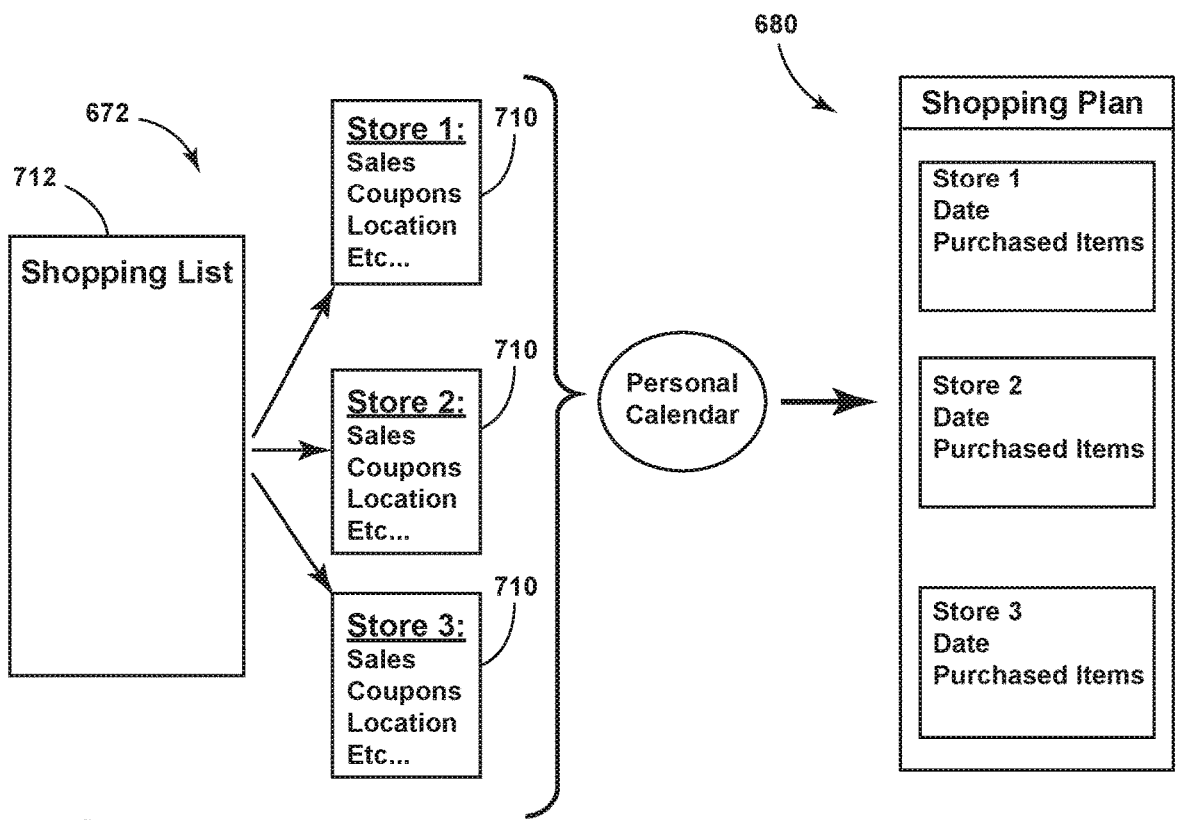
FIG. 10 is a flow diagram illustrating an exemplary process for formulating a shopping plan utilizing the object recognition system.
Figure 11:
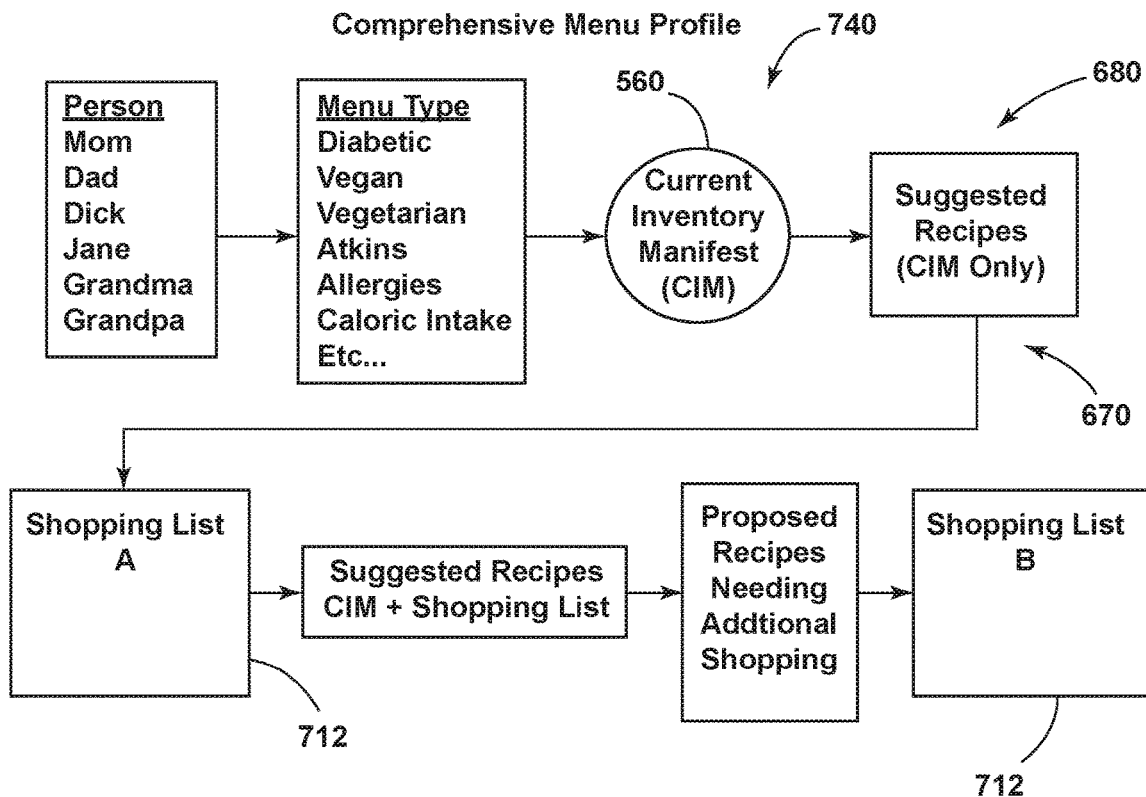
FIG. 11 is a flow diagram illustrating an exemplary process for formulating a shopping list utilizing an aspect of the object recognition system.
Figure 12:
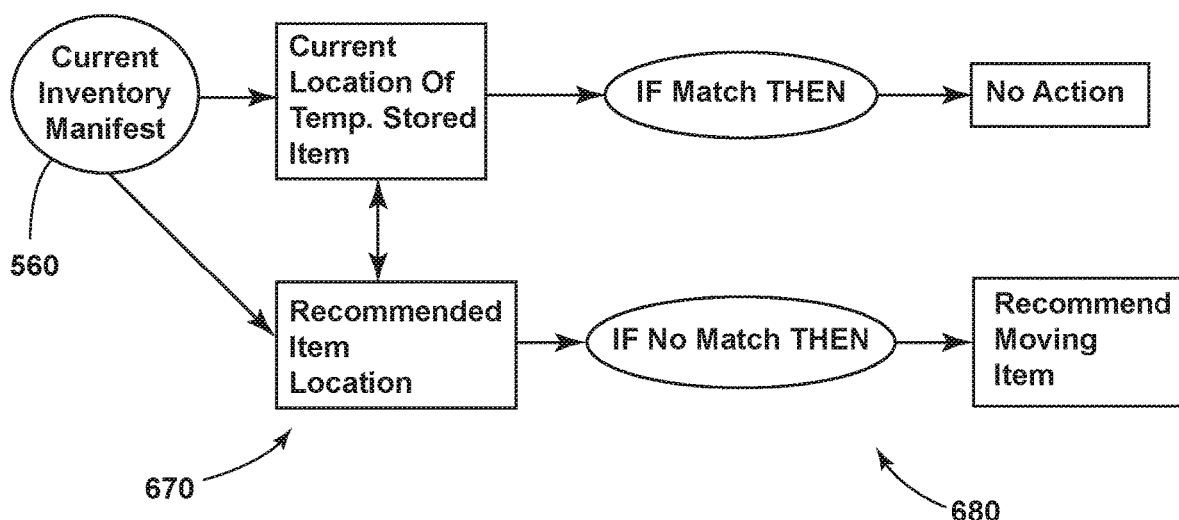
FIG. 12 is a flow diagram illustrating an exemplary process for managing inventory of the current inventory manifest utilizing an aspect of the object recognition system.

According to the various embodiments, as exemplified in FIGS. 6 and 7, it is contemplated that the cameras 570, when disposed on the doors 526 of the appliance 510, can be used to capture a three-dimensional image and/or a panoramic two-dimensional image of the contents of the refrigerated compartment 520. In this manner, as the doors 526 are rotated from the closed position 530 to the open position 528, or vice versa, a series of successive scans 660 that make up a data capturing phase 550 can be performed as the doors 526 move between the open and closed positions 528, 530. In this manner, the perspective of each camera of the scanning apparatus 544 will be slightly moved during each successive scan 660 of the data capturing phase 550, such that, when the data is stitched, combined, or otherwise aggregated, the resulting data represents a three-dimensional image and/or a panoramic two-dimensional image of the interior 572 of the refrigerating compartment 518. The points at which each data capturing phase 550 is performed during the movement of the doors 526 can be dictated by a predetermined rotational position of each door 526 relative to the open and/or closed position 528, 530 as the door 526 is moved. In such an embodiment, rotational sensors within the door 526 hinges can monitor the rotational positions of the doors 526 for conducting the series of successive scans 660. Accordingly, whether the door 526 is open quickly or slowly, the data capturing phases 550 can be taken at substantially the same rotational angles in order to create substantially similar three-dimensional and/or two-dimensional data images for providing an efficient comparison and for providing an accurate data representation of the current inventory manifest 560.

It is also contemplated that the cameras 570 can be configured to capture video as the doors 526 are moved between the open and closed positions 528, 530. It is contemplated that video recorded, according to various embodiments, can then be converted from video to still images to create either two-dimensional or three-dimensional images for generating the current inventory manifest 560 of the appliance 510.

According to these various configurations of the scanning apparatus 544, it is contemplated that the number of cameras 570 or other data capturing points can be substantially limited. Accordingly, it is contemplated that only a portion of the compartments of the appliance 510 may be fitted with a scanning apparatus 544. It is contemplated that the scanning apparatus 544, according to various embodiments, may be fitted only in portions of the appliance 510 that are accessed most frequently.

Referring again to FIG. 8, in order to arrive at the current inventory manifest 560, the appliance 510 can include a processor 670 that cooperates with the object recognition system 672 and receives, stores, modifies, processes and compares all of the data recorded during the first and second data capturing phases 552, 554. It is contemplated that each of the first and second data capturing phases 552, 554 can include numerous sub-phases, such as where a three-dimensional image is generated for calculating the current inventory manifest 560. Accordingly, each of the first and second data capturing phases 552, 554 represents a particular data gathering process whereby data, as to the temporarily stored items 542 and other contents of the appliance 510, doors 526, and various compartments and subcompartments of the appliance 510, can be obtained, copied or recorded for producing a current snapshot of the contents of the appliance 510. These data capturing phases 550 can be compared to a previous "snapshot" of the contents of the appliance 510 that was recorded during the first data capturing phase 552 to form the current inventory manifest 560.

In addition to visual scanning through color or black and white cameras 570, alternate imaging techniques can be implemented during the first and second data capturing phases 552, 554. Such imaging techniques can include bar code scanning, thermal scanning, infrared scanning, laser scanning, sonic or acoustical scanning, echo location, and other similar scanning/imaging techniques.

Referring again to FIGS. 1-7 and 17-23, where a U-shaped shelf 640 is installed within the refrigerated compartment 520, the temporarily stored items 542 disposed on each U-shaped shelf 640 can be placed such that they are continually near an outside perimeter of the U-shaped shelf 640. An operable large clear tuck shelf 640 can also be disposed in the center, where additional space is needed. By organizing items around the perimeter of the U-shaped shelf 640, maximum viewing angles are created to assist the scanning apparatus 544 and recording data concerning the stored items disposed within the refrigerating compartment 518 creating synergistic results for the system of the present disclosure. Additionally, the U-shaped configuration provides for placement of the temporarily stored items 542 that produces a minimal risk of visual blocking of certain items from the various portions of the scanning apparatus 544. By providing for the storage of the temporarily stored items 542 on the peripheral of each of the U-shaped shelves 640, the shelf 640 can help guide consumers to place items at an appropriate location and at a convenient and efficient distance from the cameras 570 for optimal viewing by the scanning apparatus 544. This effect creates maximum views, fuller views and clearer views of more of the temporarily stored items 542 within the refrigerating appliance 510. This configuration also creates better views as to each of the shelves 640, such that visual blockage in a vertical direction can also be minimized. According to various embodiments, it is also contemplated that the scanning apparatus 544 can be operable within the appliance 510 such that the various cameras 570, scanners 620, and other components of the scanning apparatus 544 can be operable within the appliance 510 for gathering a maximum amount of information concerning the various storage surfaces 540 and temporarily stored items 542 disposed thereon or therein.

Referring now to FIGS. 3, 4 and 20-33, various views of a FDBM refrigerator are exemplified with the refrigerator doors 526 open. In the refrigerator cabinet 512 shown, there are three U-shaped shelves, respectively labeled 101, 102 and 103. Also shown on each of the shelves is a raised area 104 around the perimeter of each of the shelves 101-103. When utilized, the raised area 104 prevents spills from coming down from edges of the sides, back or inside of the refrigerator cabinet 512. The U-shaped shelves 101-103 could be mounted on ribs or guides which extend outwardly from the visible surface of the refrigerator cabinet 512. Alternatively, there could be recesses in the cabinet 512 with projections on the shelves 101-103 sliding into the recesses, or the shelves 101-103 could be mounted on slidable brackets. However, the exemplary embodiments are not limited thereto and other known methods of attaching the U-shaped shelves 101-103 to the inside of the refrigerator may be used, as would be understood by one of ordinary skill in the art. It may be possible to mount the shelves 101-103 of the present disclosure to both sides and the rear wall and not utilize a center mounting bracket/system as is often used currently to support shelves that only extend across a maximum of one-half the width of the refrigerating compartment 518. The shelves of the present disclosure typically extend across the entire width or substantially the entire width of the refrigerating compartment 518. The shelves 101-103 of the exemplary embodiments provide a panoramic view. Any of the shelves 101-103 or all of the shelves 101-103 can have clear tuck shelves therein or removable shelves that are simply slidable out of the U-shape or lifted out of the U-shape by lifting the removable shelf upwards, typically straight up. A bottom U-shaped shelf is typically the same as top U-shaped shelf 111, 112 and has grooves therein 126, 129 for receiving a tuck shelf that could be put into place and slid in under the back of the U shape to provide more space for taller items below U-shaped shelf 113, 114 in the refrigerator cabinet 512.

Figure 21:
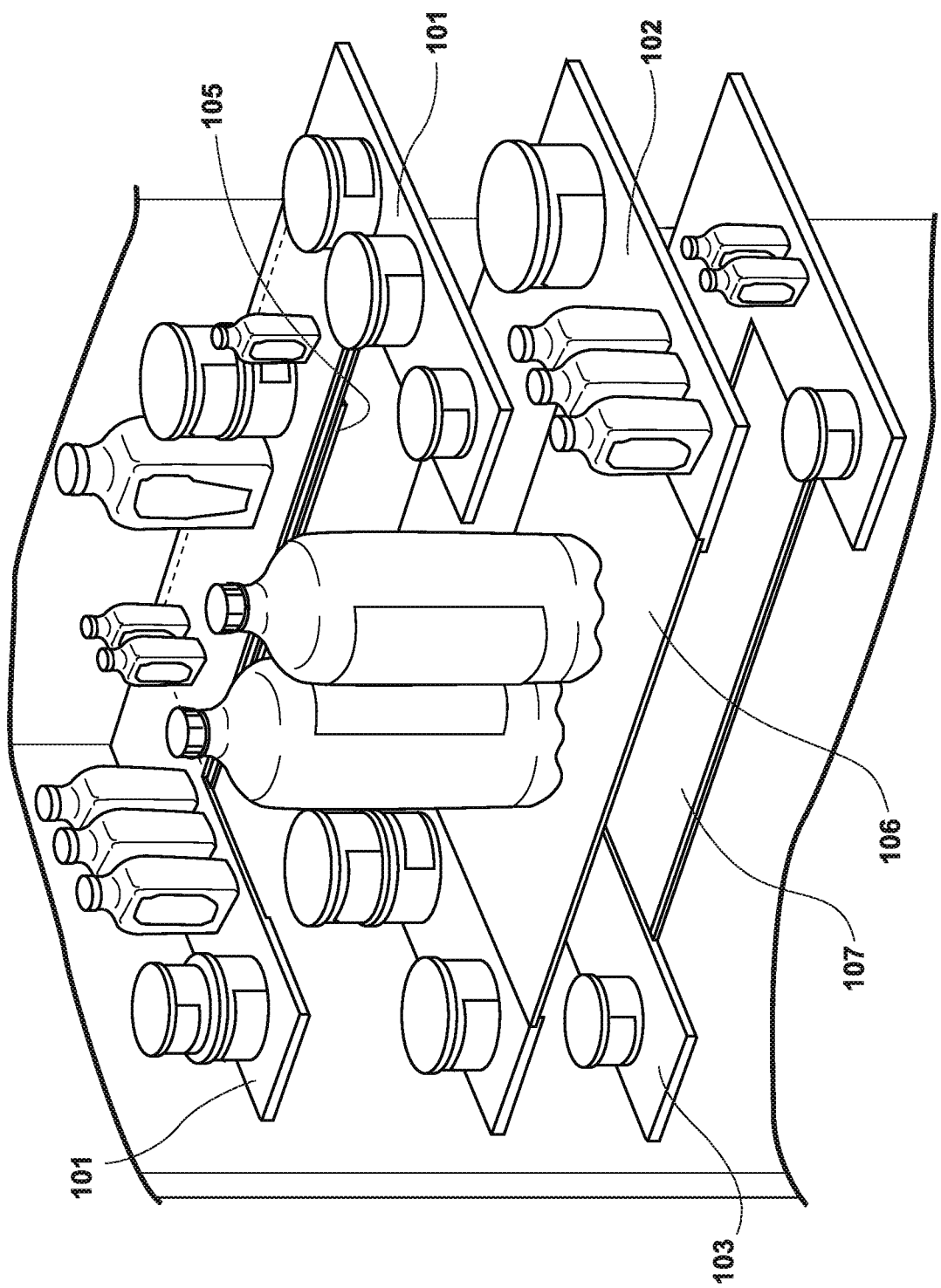
FIG. 21 is a perspective view of the U-shaped shelves of a FDBM refrigerator, showing temporarily stored items positioned on the shelves within the refrigerator cabinet.
Figure 22:
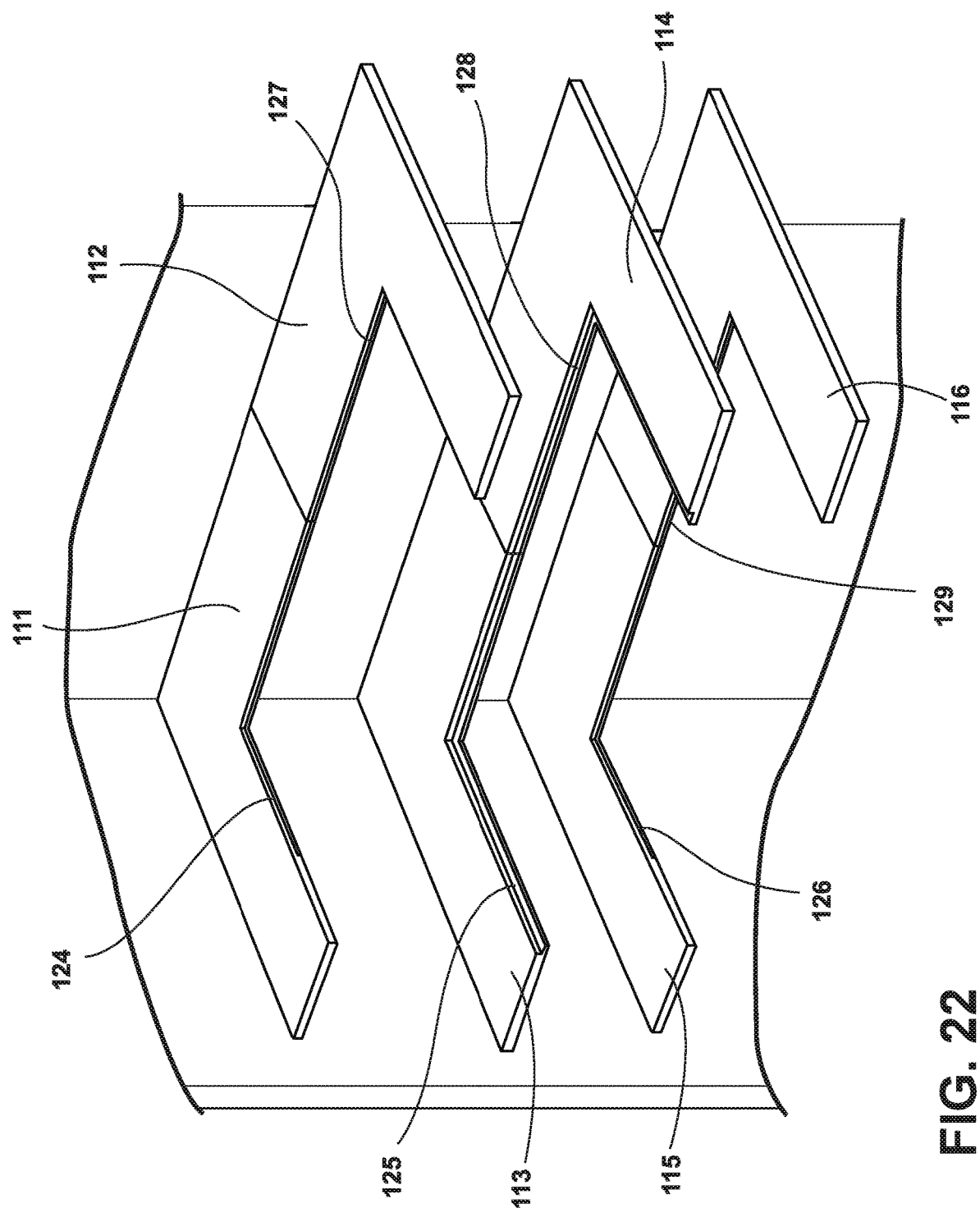
FIG. 22 is a perspective view of two piece U-shaped shelves within a FDBM refrigerator.
Figure 23:
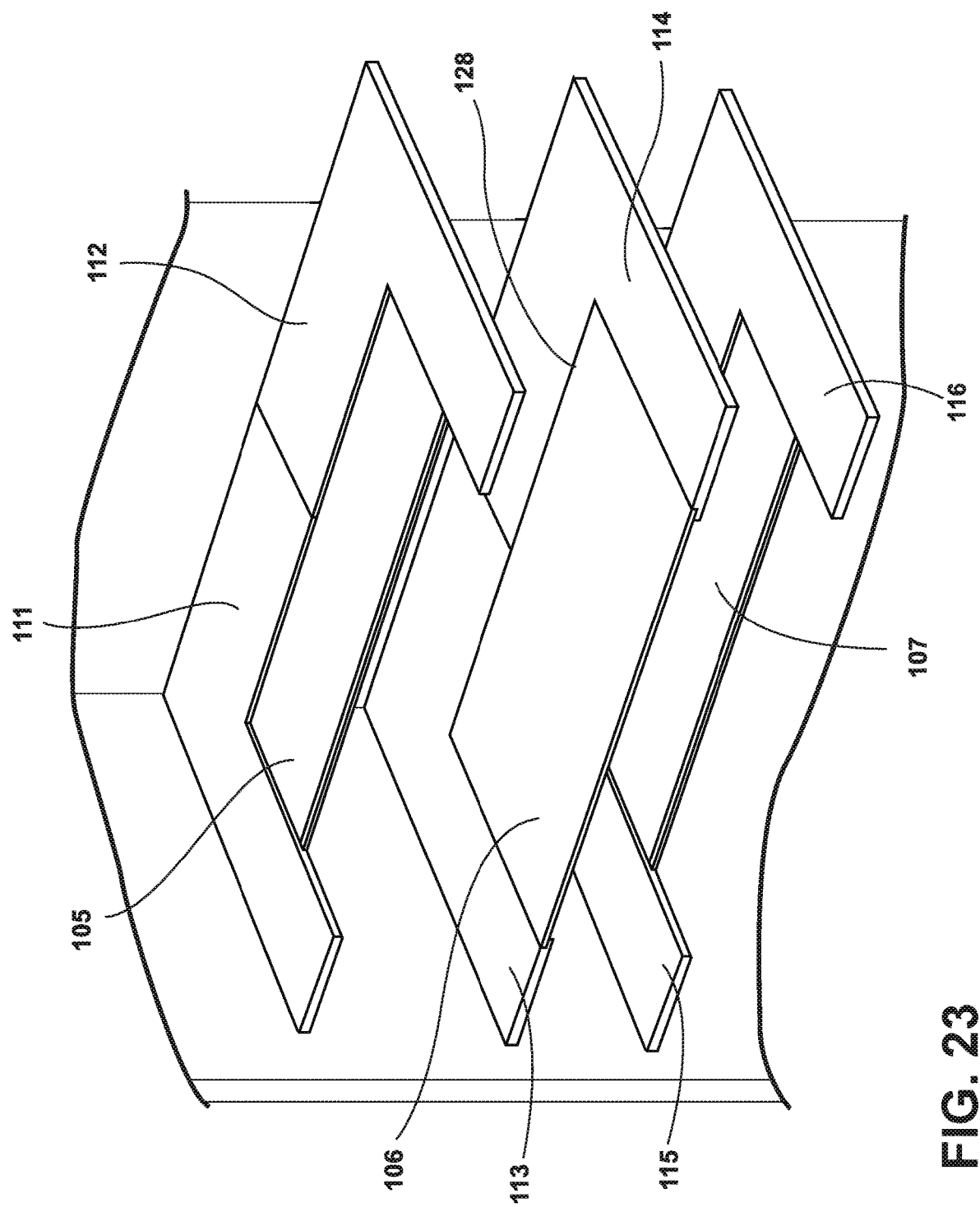
FIG. 23 is a perspective view of two piece U-shaped shelves within a FDBM refrigerator where the shelves have glass inserts which may be removable shelves or tuck shelves.

Referring now to FIGS. 21-23, a front view of a FDBM refrigerator is exemplified showing the French doors 526 in an open position 528. In this exemplary embodiment, three U-shaped shelves are shown. The opening in the U-shaped shelf 108 can be shifted over to one side. This recess and the other recesses could have either have a removable shelf 106, a tuck shelf 107, or no shelves at all. In addition, the various shelves for selectively occupying the various recess configurations can be made of glass, plastic, wood, a wood-looking material, combinations thereof, or other similar material.

As exemplified in FIG. 23, two tuck shelves are included within U-shaped shelves 111, 112 and 115, 116. A top U-shaped shelf 111, 112 may have a first tuck shelf 105 that can slide in a horizontal manner under the back of the U shaped shelf 111, 112. The second U-shaped shelf 115, 116 has a tuck shelf 107. In addition, middle U-shaped shelf 113, 114 may have a removable shelf 106 therein. The removable shelf may be slid or lifted out of the U-shaped shelf. In addition, the removable shelf 106, as shown, fills the U-shape of the U-shaped shelf 115, 116 but can be configured to fill less than all of the U-shape of this U-shaped shelf when in the extracted position. In addition, tuck shelves 105 and 107 can be replaced with removable shelves. Alternatively, there may be no shelves within the center portions of the U-shaped shelves 111-116 of this exemplary embodiment.

According to the various embodiments, it is contemplated that a particular data scanning phase can incorporate multiple components. By way of example, and not limitation, an initial portion of the data capturing phase 550 may be conducted to determine substantial changes in the configuration of the storage surfaces 540 and the various temporarily stored items 542 within the refrigerated compartment 520. It is contemplated that where no substantial changes have been made, such as when an individual opens the refrigerator door 526 and closes the door 526 a very brief time thereafter, a lower resolution scan may be conducted. Additionally, the refrigerating appliance 510 may include motion sensors 650 (shown in FIG. 1) that can detect movement within the refrigerated compartment 520 that can be activated when the doors 526 are moved to the open position 528, in order to determine whether any movement has been made to the storage surfaces 540 and/or the temporarily stored items 542 of the appliance 510. In situations where a user simply opens the door 526 and views the contents without actually engaging any of the one or more temporarily stored items 542, the motion sensors 650, when detecting no movement, can instruct the scanning apparatus 544 to refrain from conducting a data capturing phase 550, as no substantial changes may have been made since the previous data capturing phase 550. Accordingly, the motion sensors 650 can be configured to detect when an individual places their hand within the refrigerating compartment 518, or within a portion of the door 526 of the appliance 510, to access one or more of the temporarily stored items 542. Where no such movement is detected, the scanning apparatus 544 can be instructed, such as by a processor 670 of the appliance 510, the motion sensors 650, or other control mechanism, to refrain from undertaking a data capturing phase 550. Alternatively, the scanning apparatus 544 can be instructed to undertake a low level or low resolution data capturing phase 550. Such motion sensors 650 can include, but are not limited by, door switches, proximity sensors, infrared sensors, lasers, acoustical motion sensors, combinations thereof and other similar motion sensing devices.

It is also contemplated that the scanning apparatus 544 can be instructed to undertake a data capturing phase 550, each time the door 526 is being moved to the closed position 530, whether the interior 572 of the refrigerated compartment 520 has been accessed or not.

According to the various embodiments, as exemplified in FIGS. 8-16, the current inventory manifest 560 is derived through use of the scanning apparatus 544 with a listing of their current inventory contained within the appliance 510. Such an inventory can be provided to the user through a read-out on the appliance 510 itself, or through various wireless communications transferred from the appliance 510 to an exterior computing device such as a personal computer or a mobile computing device with a touch screen display, memory and one or more processors. In this manner, data regarding the current inventory manifest 560 of the appliance 510 can be delivered via email, text, status update, ping, or other digital notification to a user's portable computing device 630. Such a portable computing device 630 can include, but is not limited to, a cell phone, smart phone, tablet, laptop, desktop computer, wearable computing device, or other similar computing device. It is also contemplated that data from the data capturing phases 550 and the information concerning the current inventory manifest 560 of the appliance 510 can be delivered to a "cloud" storage location for easy access by the object recognition system 672 and/or the user through any one or more of the portable or stationary computing devices described above. Accordingly, because the current inventory manifest 560 of the appliance 510 is continually accessible by the user, the user may not need to sort through the various temporarily stored items 542 contained within the appliance 510 to determine what items are within the appliance 510. The current inventory manifest 560 can be displayed as an itemized, categorized, or otherwise organized list. Such organization of the list can be dictated by the user based upon their needs at a particular time.

As discussed above, the portable computing device 630 can include a non-transitory computer readable medium that stores one or more programs and the graphical user interface on a computing device with a touch screen display, a memory, and one or more processors to execute one or more programs stored in the memory, wherein the touch screen device is operatively connected to one or more database servers via a wired or wireless network of the present invention.

By way of example, and not limitation, a user standing near a meat department of a grocery retailer can conveniently access the current inventory manifest 560. The user can then categorize the current inventory manifest 560 to display those meat products, meat-related items and items that can be prepared with meat products for various recipes. It is contemplated that a myriad of category configurations can be used to display all or a portion of the current inventory manifest 560 to allow the user to most efficiently and conveniently access the information.

In addition to the current information regarding the temporarily stored items 542, the current inventory manifest 560 can also include data concerning the history of a particular temporarily stored item 542. Accordingly, an inventory management system 680 can be provided in conjunction with the current inventory manifest 560 to provide information about any one or more of the temporarily stored items 542 within the appliance 510. Such information can include, but is not limited to, the date that the item was originally purchased and/or placed within the appliance 510, information regarding how many times the particular temporarily stored item 542 has been taken out and put back into the appliance 510, the amount of time the temporarily stored item was not spaced within the appliance, and other various information concerning the history of a particular temporarily stored item 542. Such information can allow the user to understand how quickly a particular item is being used or consumed. Accordingly, such information can inform the user as to what size of a particular consumable or perishable item they should be purchasing to meet their needs. Additionally, such information can be compared with a recorded expiration date of the particular temporarily stored item 542 to determine whether items are close to being spoiled or have spoiled. The information about the amount of time an item is not spaced within the refrigerator may also be used to warn a user about spoilage that may have occurred simply from being away from a refrigerated or freezing chamber for too long of a time period. A system for detecting spoilage and alerting the user will be described more fully below.

According to the various embodiments, by recording the number of times that an item has been taken out of the refrigerator and replaced, such information can be helpful in determining the contents remaining within the container 578 of the temporarily stored item 542. This can be particularly helpful where the temporarily stored item 542 includes an opaque or only partially translucent container 578. By way of example, and not limitation, the user cannot readily see the remaining contents 580 of a container 578 of sour cream that has been put back into the refrigerator. However, information that the sour cream has been taken out and put back into the refrigerator a total of 15 times can be useful in assessing how much sour cream remains in the container 578. As discussed above, the scanning apparatus 544 can also include a scale 590 in one or more of the storage surfaces 540 that can also assist in assessing the remaining contents 580 of a particular temporarily stored item 542. However, where no scale 590 is present, the number of times that a particular temporarily stored item 542 has been taken out and placed back in the appliance 510 can allow the user to make judgement, and/or allow the object recognition system 672 to propose a recommendation, as to the remaining contents 580 within the container 578 of a temporarily stored item 542.

Additionally, according to the various embodiments, when the scanning apparatus 544 records or tags a date when the item was first placed in the refrigerator, the user can use this information to make an assessment as to whether an item is spoiled or not. Typically, certain temporarily stored items 542 spoil faster than others, i.e., milk may spoil faster than mustard. Additionally, in the case of a storage container 610 that may contain leftovers from a previously prepared meal, information regarding the date that the storage container 610 was placed in the refrigerator can inform the user about how old the leftovers contained therein might be. For example, the user can be informed that a container 578 of leftovers was placed in the refrigerator seven days previously. Based upon this information, the user can either be prompted with a recommendation to consume or dispose of the leftovers, or the user can simply make an assessment on their own as to what to do with the leftovers contained within the particular storage container 610.

It is contemplated that, where numerous storage containers 610 that may look identical are placed within the refrigerator, individual and distinct identifier tags 612 may be contained within or on a portion of a storage container 610. Alternatively, tags 612 can be attached after purchase of the particular storage container 610. It is contemplated that a system of storage containers 610 having tags 612 can include digital tags 612 for identifying one storage container 610 relative to another. Such tags 612 can be indicia that can be scanned by the scanning apparatus 544 of the appliance 510. Alternatively, the appliance 510 can include a radio-frequency identification (RFID) reader system that can work in conjunction with the system of tags 612, such as RFID tags, of the storage containers 610 to identify one storage container 610 relative to another and also identify the contents of one storage container 610 relative to another. Where an RFID or other wireless or digital tag 612 is implemented, information concerning the contents of a particular storage container 610 having an RFID tag 612 can be input or modified either at a control for the appliance 510, or through a portable computing device 630 of the user. The tag 612 for each of the storage containers 610 for holding various food or other perishable items can include various digital, physical, visual or other indicia that can be scanned through the scanning apparatus 544 of the appliance 510. In such an embodiment, such tags 612 can include, but are not limited to, bar codes, an applied indicia (i.e., number, letter, symbol, color, combinations thereof, etc.), a physical shape of the container 578 or a physical shape of a portion of the container 578 (i.e., a shape of a handle, a raised relief, an indented portion, combinations thereof, or other similar physical feature of the storage container 610).

According to the various embodiments, the scanning apparatus 544 can include various input methods for identifying what temporarily stored items 542 are contained within the appliance 510. These methods can be accomplished by various components of the scanning apparatus 544, where such components can include, but are not limited to, cameras 570, scanners 620, visual sensors, acoustic sensors, light sensors, scales 590, hand scanners, infrared scanners, infrared cameras 570, laser scanners, RFID readers, 3-D imaging, tactile sensors, GPS, and other similar sensors that can be used to determine various status, location, life span, and other information concerning the various temporarily stored items 542. Through these various components of the scanning apparatus 544, various methods for importing the identity of one or more temporarily stored items 542 can include, but is not limited to, scanning an item to be placed within the appliance 510, photographing or otherwise imaging each temporarily stored item 542 to be placed within the appliance 510, scanning a container 578 for a temporarily stored item 542 when the container 578 is empty or about to be emptied, a customer-initiated scan or photograph of a temporarily stored item 542 as each item is removed from or placed in the appliance 510, scanning a receipt 690 from a store (described more fully below), combinations thereof, and other similar data gathering and optional analyzing methods.

According to the various embodiments, as exemplified in FIGS. 1-17, it is contemplated that the scanning apparatus 544 can be integrated with one or more grocery retail stores 710 or other retailers such that the current inventory manifest 560 can be compared with the inventory, prices, or used in conjunction with "frequent shopper" or rewards programs of one or more retail stores 710. In this manner, the current inventory manifest 560 can be compared with such retailer data to formulate a shopping list 712 for the user based upon retail store 710 location, relative prices, dates of sales, and other information such that shopping trips can be organized for the most efficient use of the user's time. In addition, this information can be combined with the user's own schedule, such that if the user is running an errand in a particular geographic location, the user can be reminded to stop by a nearby retail store 710 to fill a portion of the shopping list 712 generated by a combination of the current inventory manifest 560 of the appliance 510 and information regarding that particular retail store 710. Additionally, as a particular user is walking through the retail store 710, information concerning items contained within a particular aisle can be presented to the user such that a user can be reminded to look for a certain item in a particular aisle. Such a reminder from the object recognition system 672 can avoid aimless wandering through vast aisles of retail space and can generate a more efficient shopping trip.

In order to monitor a user's position within a retail store 710 in relation to various products within a particular aisle, the object recognition system 672 can work in conjunction with various information networks integrated into the retail store 710. One such network is an indoor positioning system (IPS) that provides information relating to the locations of people and objects within the retail store using radio waves, magnetic fields, acoustic signals, or other sensory information collected by portable computing devices 630. The IPS can also utilize wireless technologies, such as Bluetooth®, WiFi, etc., to transfer the data to the user. One such IPS is iBeacon™, although others are contemplated. Other indoor wayfinding solutions include, but are not limited to, micro-mapping, indoor mapping, indoor proximity systems, and others. These IPS systems and similar systems can communicate with the user's portable computing device 630, inertial measurement units, wearable computing devices and other devices incorporating a positioning capability, and work in conjunction with the current inventory manifest 560, shopping list 712, comprehensive menu profiles 740 (described below) and other components of the object recognition system 672.

According to the various embodiments, the scanning apparatus 544 of the appliance 510 can include an imaging system having resolution providing enough detail to capture labels of particular temporarily stored items 542, bar code information, and other detailed information concerning particular temporarily stored items 542 purchased from various retail stores 710. This label information can be stored to assist in the formation and maintenance of the current inventory manifest 560.

In conducting each of the data capturing phases 550, it is contemplated that different colors of light and different types of light can be illuminated during various subroutines of the data capturing phase 550. Changes in the color of light such as between blue, green, red and other colors, can reveal different characteristics concerning various temporarily stored items 542. Such use of colors can also allow the imaging system to record data through translucent containers 578 having colored materials. Additionally, different types of light (i.e., fluorescent, incandescent, LED, halogen, combinations thereof, etc.) can have an effect on how the temporarily stored item 542 is viewed by the scanning apparatus 544. Certain types of artificial light may travel through various containers 578 in a more efficient and effective manner than other types of artificial lighting. The use of alternate lighting colors and lighting types can also help to distinguish between temporarily stored items 542 that may have a similar shape, or containers 578 for temporarily stored items 542 that may have a similar shape. The use of types of colors of light can also assist in determining the state, such as in terms of spoilage, remaining contents 580, and other information, of certain temporarily stored items 542. In this manner, the output related to the temporarily stored item 542 can be a shopping list 712 delivered by the object recognition system 672 to the user of a specified set of temporarily stored items 542 that need to be replenished.

Referring now to various aspects of the device as illustrated in FIGS. 1-11, the scanning apparatus 544 of the appliance 510 can be used to generate the current inventory manifest 560. The current inventory manifest 560 can be analyzed, and, based on the status of any one or more temporarily stored items 542, a shopping list 712 for the user and the entire household can be generated based on the current inventory manifest 560. It is contemplated that the current inventory manifest 560 can include information concerning the amount of a particular temporarily stored item 542 that is remaining, the life span of the temporarily stored item 542, the date that the temporarily stored item 542 was disposed within the appliance 510, and other information concerning the life span of a particular temporarily stored item 542. According to the various embodiments, when a particular temporarily stored item 542 is about to be fully used or consumed, the item 542 can be automatically added to a shopping list 712 that can be delivered to the user. The shopping list 712 can be stored either within the appliance 510, within a user's portable computing device 630, or within a "cloud" data storage computer system accessible via a wired or wireless network.

Figure 13:
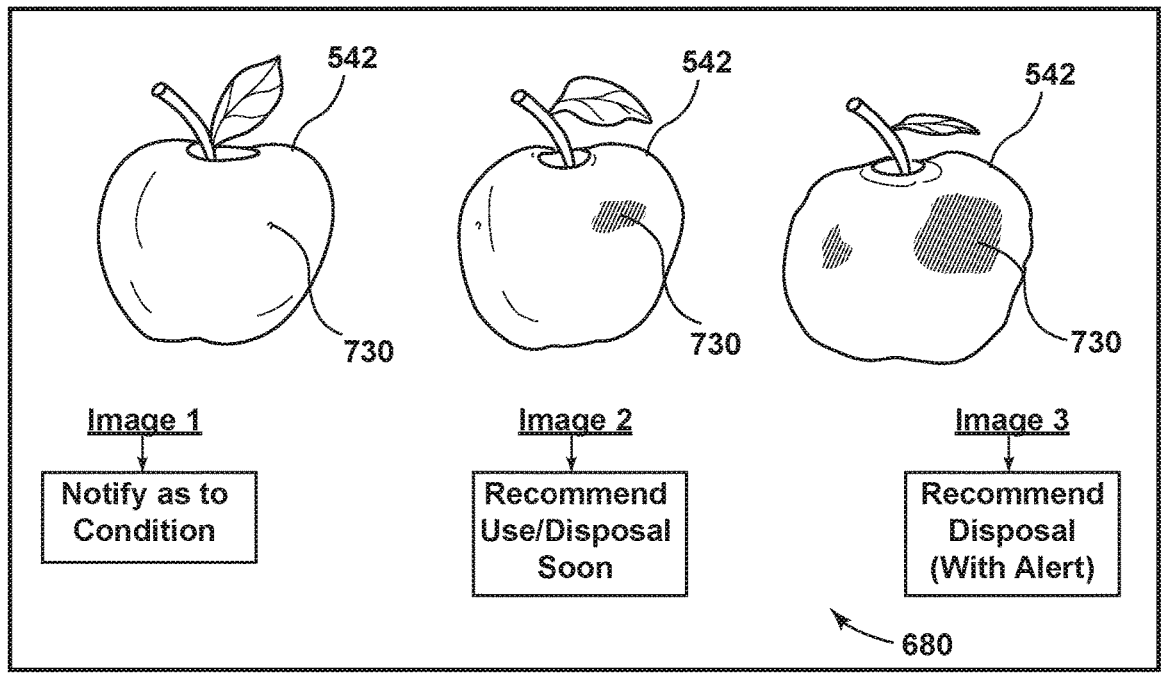
FIG. 13 is a schematic diagram illustrating an aspect of the object recognition system for assessing spoilage of various temporarily stored items.
Figure 14:
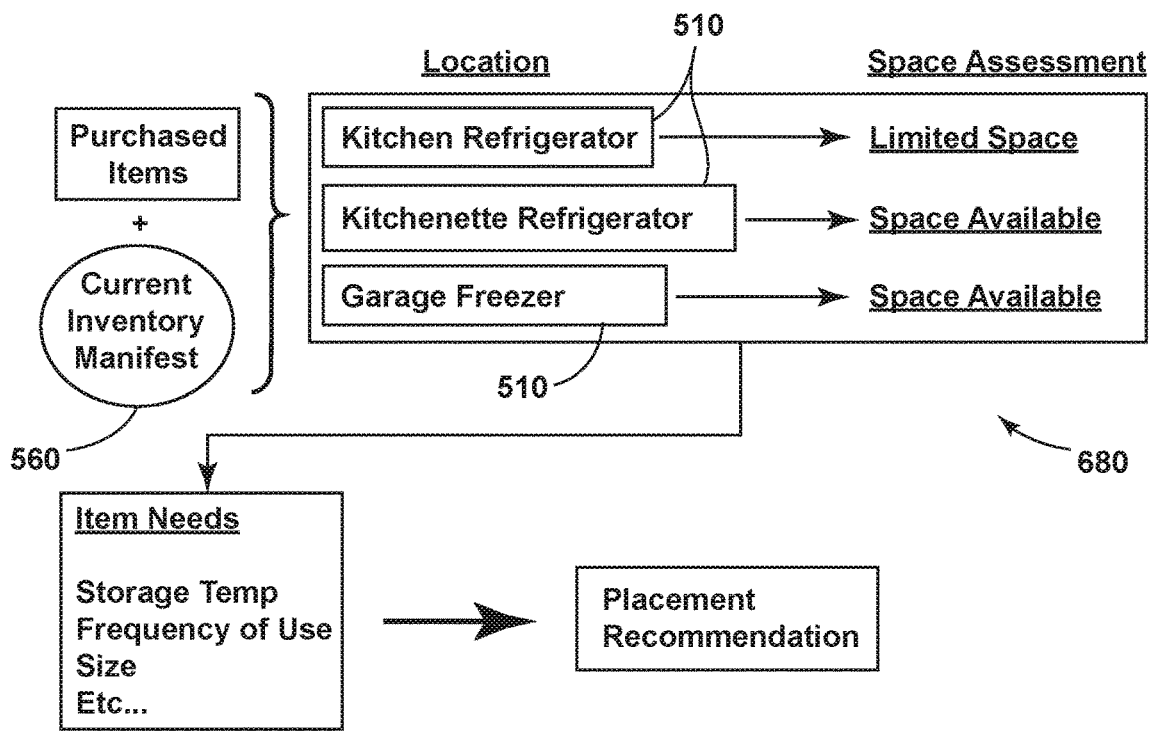
FIG. 14 is a schematic diagram illustrating an aspect of the object recognition system for managing the current inventory manifest in conjunction with one or more appliances to determine object placement.
Figure 15:
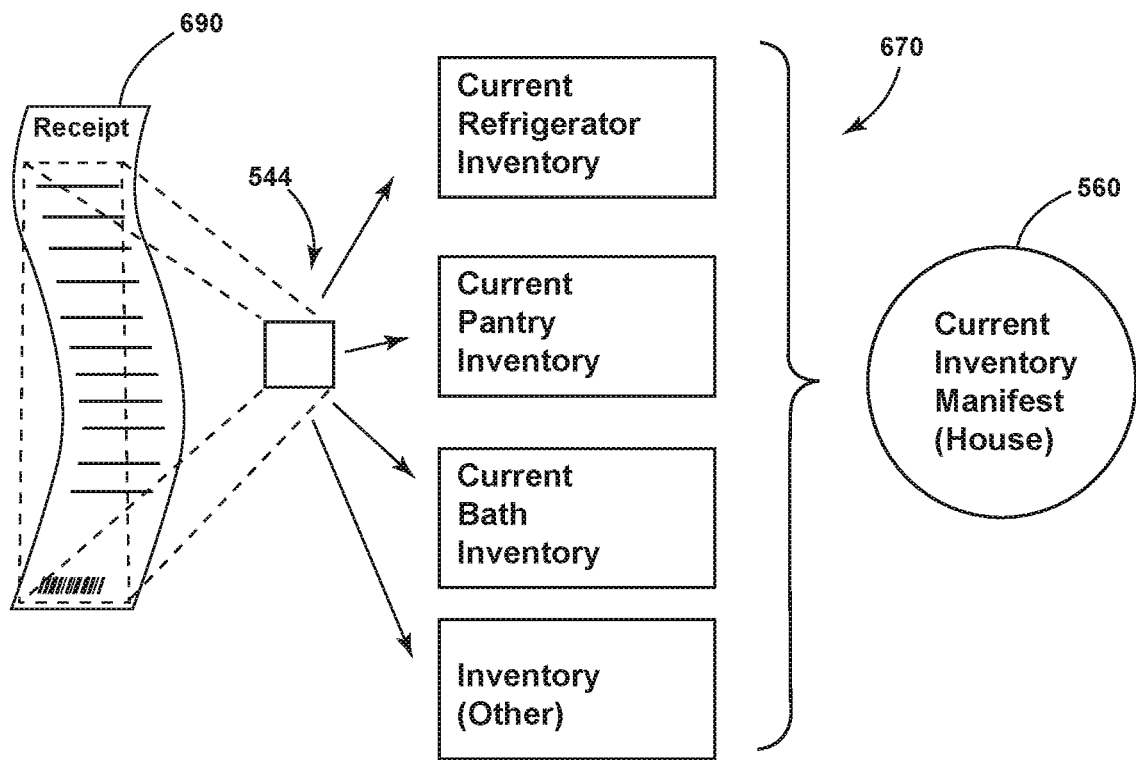
FIG. 15 is a schematic diagram illustrating an aspect of the object recognition system for inputting temporarily stored items within a current inventory manifest, according to at least one embodiment.

Referring now to FIG. 13, according to the various embodiments, where a particular temporarily stored item 542 is about to reach its designated expiration date, the temporarily stored item 542 can be automatically added to the shopping list 712. Additionally, the user can be prompted to use the remaining amount of the temporarily stored item 542 before a certain date or to dispose of the particular item if the expiration date has been reached or exceeded. In connection with such a prompt or recommendation, various recipes can be suggested to the user that incorporate the particular temporarily stored item 542 that is about to exceed its expiration date.

Additionally, in the case of fruits and vegetables, as exemplified in FIG. 13, visual scanning can be utilized to assess any bruising, old spots, mold or other surface conditions of the food item that may be indicative of that particularly stored item exceeding its useful life. When such an indication is apparent, the user can be provided with a prompt or recommendation to use or dispose of the particular temporarily stored item 542, and the item can also be added to the shopping list 712.

It is also contemplated that where a particular temporarily stored item 542 is about to reach its expiration date without being substantially consumed or otherwise used, the user can be prompted with a question as to whether or not to add the particular temporarily stored item 542 to the shopping list 712, since the item was previously purchased and not substantially consumed or otherwise used. By way of example, and not limitation, where 10 bananas are purchased, but only a minimal number or none of the bananas are used or otherwise consumed, the object recognition system 672 incorporating the scanning apparatus 544 can ask the user whether bananas should be added to the shopping list 712 and/or that fewer bananas or no bananas be purchased during the next shopping trip.

Referring again to FIG. 10, after the shopping list 712 is developed using the current inventory manifest 560, the object recognition system 672 can work in conjunction with various retailer stores, retailer web sites, and other similar sources of information as to retail prices of various retail stores 710, sales provided by retail stores 710, and other pricing information of various retail stores 710 within the user's area. Accordingly, as discussed above, a schedule of shopping trips can be suggested to the user based on particular prices, sales, the user's scheduled events for a particular time period, and other information to make each shopping trip as efficient as possible. Additionally, where paper coupons are necessary during a certain shopping trip, the object recognition system 672 can cooperate with a local or network printer via a wired or wireless network connection to automatically print out various coupons that correspond to the current inventory manifest 560 and/or the shopping list 712 presented to or accessible by the user. Additionally, the shopping list 712 can be communicated to a grocery delivery service where the delivery service receives the shopping list 712 prepared by the object recognition system 672 and delivers the necessary groceries to the user's household. Before such a shopping list 712 is delivered, the user may have the opportunity to approve items on the shopping list 712 or require that a certain expected cost for the items be reached. The user can also request a maximum amount to be spent, particular quality of products (i.e., organic, locally produced, brand, style, retailer, appearance) and other requested details that the user may take into consideration if they were to undertake the task of shopping themselves. Various preferences of the user can be recorded within the object recognition system 672 and saved for later use.

It is also contemplated that the object recognition system 672 incorporating the sensing apparatus can be used in conjunction with various calendars, weather information, event calendars, holiday schedules, daily schedules, and other dates, events and occurrences that may occur during a given time period. According to various embodiments, it is contemplated that the object recognition system 672 can operate in conjunction with the various weather reports to suggest the purchase of items that may be needed during a storm, during a particularly severe warning having an appreciable advance notice such as a hurricane, thunderstorm, heat wave, snow storm, period of extreme cold, or other similar weather occurrence. Various other items can be suggested for additions to the shopping list 712 that may be needed during or after the particular weather occurrence. By way of example, and not limitation, in a region that may receive a hurricane warning, the object recognition system 672 can suggest adding various items that may be needed during or after the hurricane, such as, but not limited to, batteries, consumable bathroom products, generators, fresh water, portable grills, and other similar items that may be useful in weathering and recovering from a particular weather event.

The object recognition system 672 can also work in conjunction with various scheduled events such as holidays, sporting events, or scheduled gatherings. By way of example, and not limitation, where a birthday of a member of a household is scheduled, certain items can be suggested for addition to the shopping list 712 that may be useful or appreciated during the birthday party. Such items can include, but are not limited to, cake mix, frosting, candles, wrapping paper, and other similar items that may be desired during a party.

As previously discussed, items added to the shopping list 712, whether regularly purchased items, items for special events or weather or other emergency situations, the object recognition system 672 can coordinate the shopping list 712 with information gathered concerning various retailers to create an agenda or schedule for various shopping trips to specific retailers for purchasing the items on the shopping list 712 and notify the user that the item(s) are in stock by the retailer at that time.

It is also contemplated, according to the various embodiments, that the object recognition system 672 can compare the shopping list 712 against various local events such as farmer's markets, various festivals, art fairs, and other similar events. In the case of a farmer's market, the shopping list 712 can suggest purchasing certain items generally available at farmer's markets, especially items that are considered "in season" for the geographic region at the time.

As discussed previously, the object recognition system 672 incorporating the scanning apparatus 544 can detect, record, and provide to the user information concerning the lifespan, expiration, spoilage, or other lifespan related data with respect to one or more temporarily stored items 542. A scanning assembly can record various information directly off from the temporarily stored item 542 related to an expiration date, or use-by date, that can be imprinted directly on the temporarily stored item 542. The object recognition system 672 may also be configured to recognize when an item is about to or has spoiled, such as produce, dairy products, and other perishable items. With respect to produce, the scanning assembly can detect, through visual inspection, infrared inspection, inspection under various lighting colors or lighting types, and other imaging techniques, whether an item of produce has spoiled. In this manner, this scanning assembly can detect, over time, progressive bruising, discoloration, or other physical changes in produce that occur over time.

By way of example, and not limitation, as exemplified in FIG. 13, the scanning assembly may detect a small blemish 730, bruise or other mark on the surface of an apple. Over time, and during a subsequent data capturing phase 550, the scanning assembly may detect that the discolored area of the blemish 730 has enlarged. At such time, the object recognition system 672 can alert the user that the apple is nearing its useful life and should be used or disposed of in the near future. If the item remains within the appliance 510, the scanning assembly can continue to monitor the apple, and during a subsequent phase, can detect that the affected area of the blemish 730 has expanded over a significant portion of the apple. At this time, the object recognition system 672 can alert the user and recommend that the user dispose of the apple. As discussed previously, where food spoilage occurs, the user can be prompted as to whether the item should be replaced by being added to the shopping list 712. Because the item is spoiled, the object recognition system 672 can identify that the temporarily stored item 542 was not used in a timely fashion, such that a smaller amount of the item 542 may be purchased, or that a replacement for the temporarily stored item 542 may not need to be purchased at all. The object recognition system 672 can include similar functionality for determining when a certain produce item is ripe. For example, the object recognition system 672 can include a color recording camera that can detect that a banana has turned from green to yellow and is in prime condition for being consumed.

According to the various embodiments, with respect to containers 578 of temporarily stored items 542, visual inspection can, as to some temporarily stored items 542, visually detect a change in the container 578 when a food approaches a spoilage state. By way of example, and not limitation, when a container 578 of milk approaches a spoilage state, gasses within the container 578 can accumulate and cause the container 578 to expand. This expansion can be detected by the scanning assembly and communicated to the user in form of a prompt to verify the state of the milk, dispose of the milk, combinations thereof or other similar prompt to address the potential or actual spoilage of the container 578 of milk. Additionally, it is contemplated that the scanning assembly can include air sensors that can monitor the state of the air contained within the refrigerating appliance 510. Such air sensors can include air quality sensors, pollution sensors, CO2 sensors, sensors for monitoring contaminants indicative of spoilage, and other sensors. In this manner, when a temporarily stored item 542 becomes spoiled or nears a spoilage state, various odors can be given off by the temporarily stored item 542. The scanning apparatus 544 can include an air detection mechanism that can detect such fumes and other matter in the air indicative of a spoiled food item.

According to the various embodiments, as a temporarily spoiled food items nears a spoilage state, the object recognition system 672 can alert the user to various recipes that can incorporate the temporarily stored item 542 that is nearing a spoilage state. Additionally, the object recognition system 672 can also recommend recipes that may be prepared using the temporarily stored item 542 nearing the spoilage state. If certain additional items are purchased, as discussed above, these items can be added to a shopping list 712, and the shopping list 712 can be coordinated with various information from local retailers for managing shopping excursions, as discussed herein.

Referring now to the aspects of the various embodiments as illustrated in FIGS. 1-11, the object recognition system 672 in incorporating the scanning apparatus 544 can be used for household recipe planning. The recipe planning processes can be conducted for individual members of a household or for the household in general, or both. According to the various embodiments, the refrigerating appliance 510 can include a set-up function that can be configured to receive information concerning the various members of the household. Individual members of the household can be added and specific preferences of each member can be specifically identified. By way of example, and not limitation, a household exemplified in FIG. 11 may contain Mom, Dad, Dick, Jane, Grandma and Grandpa. A selection for Grandma can bring up a menu-type function, wherein certain dietary preferences or restrictions can be identified for each member of the family. For example, Grandma may be able to select one of several menu preferences including, but not limited to, diabetic, vegan, vegetarian, specific dietary systems such as Atkins®, South Beach® and other similar dietary preferences. In addition, various allergies or dietary restrictions can also be added with respect to Grandma's preferences, such that a comprehensive menu profile 740 can be incorporated within the appliance 510 for generating shopping lists 712 and performing the shopping functions related to the object recognition system 672. As the current inventory manifest 560 is formulated through operation of the various data capturing phases 550 of the scanning apparatus 544, certain recipes can be suggested based upon the current inventory manifest 560.

Additionally, recipes can be suggested based on current inventory manifest 560 as well as the various comprehensive menu profiles 740 for each household member. Where certain menu restrictions or preferences are desired, ingredient substitutions can be recommended based upon the various menu restrictions. Accordingly, menu planning that accommodates each comprehensive menu profile 740 and/or all of the comprehensive menu profiles 740 for the various household members can be generated so that a single meal can be prepared for the entire household. Where certain menu restrictions prevent everyone from eating such recipe, ingredient substitutions can be suggested that are more compatible with everyone's comprehensive menu profile 740 within the household.

Also, it is contemplated that menu combination suggestions can be provided where the combinations can coordinate based upon ingredients, available appliances, time constraints, and other similar factors. For example, suggestions can be made for the preparation of food items for a particular meal that may be easily prepared in combination, such as one that can be made within the oven and one that can be made on a stovetop, for simultaneous preparation of foods. In addition to the specific menu types described above in formulating a comprehensive menu profile 740 for each household member, certain calorie limitations or guidelines to assist the household member in maintaining the desired caloric intake are provided. Additionally, various food profiles can also be generated where a household member desires a certain percentage of protein, carbohydrate, fat, cholesterol, or other specific identified nutrients in their diet on a daily basis.

According to the various embodiments, in order to assist each household member in maintaining a diet that incorporates the desired comprehensive menu profile 740, the object recognition system 672 can be configured to search a database of recipes, or connected to various recipe-oriented websites for researching and recommending various menu items and recipes that are compatible with the various comprehensive menu profiles 740 for the various household members. Moreover, the recommended menu items and recipes can also take into account the current inventory manifest 560, as well as the shopping list 712 generated using the current inventory manifest 560, to provide for efficient use of items currently within the household, or which will be obtained in the near future. These searched recipes can be modified or modifications can be suggested by the object recognition system 672 based upon the various comprehensive menu profiles 740. Also, the recipes can be multiplied or divided automatically to be more compatible with the number of the people eating a particular meal. By way of example, a recipe that serves four can be automatically adjusted by the object recognition system 672 by 1.5 times to be sufficient to serve a family of six.

According to the various embodiments, it is contemplated that the object recognition system 672 can incorporate a function for determining a level of cooking skill for a particular household member. This level of skill can be incorporated into the object recognition system 672 for providing recommended recipes and menu items to be prepared by various members of the household. An individual at a novice-cooking ability may be provided a selection of recommended menu items having a low-level of cooking skill required. Alternatively, an individual with a high-level of cooking skill may be provided with recommendations for more complex recipes that may require significantly more skill. The object recognition system 672 can take into account the current skill level of an individual and assist the individual in improving the cooking ability, such that recipes can be recommended that require increasing levels of skill over time.

By way of example, and not limitation, an individual at a novice-type cooking skill level may be provided recommended recipes of comparatively easy to prepare menu items, such as sandwiches, salads, certain pasta dishes, and other comparatively easy-to-prepare menu items. Over time, the object recognition system 672 can recommend increasingly more complex menu items that require additional skill to prepare. In order to assist the user in increasing their skill level in cooking, the object recognition system 672 can work in conjunction with various display screens for providing instructional videos for how to prepare various menu items. Step-by-step instructions may be provided and pre-recorded demonstration videos can also be provided. Additionally, various internet sites can be researched and provided to the user for showing sample methods for preparing various food items. Over time, the individual utilizing the various cooking techniques can learn new cooking techniques and methods so that their skill can increase over time. As the cooking skill of the individual increases, more complex recipes can be recommended to the user, where more complex recipes can include, but are not limited to, sauces, various roux recipes, marinades and more gourmet-type recipes.

As an aspect of the object recognition system 672, as the user requires additional cooking skill, additional appliances may be needed for preparing certain items, such as fresh pastas, ground items that require mixers, blenders or other appliances. Suggestions for purchasing these items as an easier way of preparing more complex recipes can be suggested automatically (without user prompting) by the system(s) of the present disclosures to the user. It is contemplated that, in various embodiments, the user may opt out of various messages/suggestions where the user may find such messages a nuisance.

The object recognition system 672 can also be programmed to be sensitive to certain preferences of the user. By way of example, and not limitation, where a user feels like having a "beef" recipe, a prompt of the object recognition system 672 can include a query of "what are you in the mood for eating?" Based upon the answer to this query, certain menu items or recipes can be suggested to the user and based upon the user's selection and the current inventory manifest 560. Various items for preparing these recipes may also be added to the user's shopping list 712 for access by the user's portable computing device 630, or for printing out for the user in preparation for the shopping excursion. Additionally, a section of the object recognition system 672 can include a file of a user's favorite recipes or most liked recipes. Where a user has several favorite recipes, these recipes can be sequenced to limit over repetition of prepared meals. It is contemplated that certain "try something new" opportunities can be recommended through the course of the routine favorite meals so that the diversity of the user's menu can be gradually increased. It is also contemplated that certain recipes that are disliked can be deleted from the object recognition system 672. Future recommendations can also be adjusted based upon "dislike" preferences.

It is also contemplated that in connection with the object recognition system 672, the menu and shopping functions and other functionalities of the object recognition system 672 can be used in conjunction with various services, internet subscriptions and other similar services that can be used in conjunction with the object recognition system 672 for suggesting products, menu items, recipes, retail store offers, sales, and other services that can make shopping and preparing meals convenient and more efficient. Such services can include, but are not limited to, Weight Watchers™, Blue Apron™, Plated™, Hello Fresh™, and others.

It is further contemplated that the object recognition system 672 can include various environmental functionalities that may add to the experience of preparing a meal. By way of example, and not limitation, the system can integrate with a kitchen speaker system (i.e., CoolVox™) and play music that may share a theme with a particular recipe. When preparing a Mexican dish, a user may desire mariachi music to be playing in the background. Similarly, holiday-themed music can be played in conjunction with recipes prepared during corresponding holiday seasons. It is also contemplated that certain videos that may provide a specific ambiance. For example, when preparing an Italian dish, a video from The Godfather may be displayed in the background. Such environmental aspects of the object recognition device can add to the experience and enjoyment of the cooking for creating more memorable events that can be shared by friends and family.

According to the various embodiments, where a comprehensive profile can be created for one or more users of the object recognition system 672, certain preferences can be changed, based upon a desired health management plan. Where a user desires to make a dietary change that affects certain parameters within their body (i.e., weight, cholesterol, caloric intake, diabetic choices, recommended disease-fighting diets, combinations thereof and other health management choices), a change can be made to an individual's comprehensive menu profile 740. As a result, recipe recommendations and shopping lists 712 can be modified to be sensitive to these health management choices. Additionally, it is contemplated that certain portion size suggestions can be recommended to manage the proper caloric intake desired by the user.

The health management system can also be integrated with the water delivery system of the appliance 510 to deliver the water being consumed by various members of the household. This can be conducted through the water dispensing system of the appliance 510 or through containers 578 of water that can be stored within the refrigerated compartment 520. In order to keep track of a particular user's water intake, it is contemplated that certain identifiers can be implemented to inform the object recognition system 672 as to which user is accessing a portion of the appliance 510. It is contemplated that such an identification system can include signal communication with a smart phone, cell phone, a wearable device, such as FitBit®, smart watch, other wearable technology, or other portable computing device 630. It is also contemplated that biometric indicators can be implemented in the form of fingerprint scanners, voice recognition, or other similar unique identifier that may distinguish one user from another. Where a user may not be consuming enough fluid over the course of a day, polite reminders, or customized reminders of varying intensity, can be provided to the user to drink more water throughout the course of a day.

It is contemplated that the object recognition system 672 for the appliance 510 can be incorporated with other appliances 510 as well. For instance, the appliance 510 can be placed in communication with a stove or oven, where the particular cooking function and time remaining can be communicated to the object recognition system 672. Where a particular recipe requires a long cooking period, this time remaining in the cooking function can be communicated to the object recognition system 672 or to the user directly, and a recommendation can be provided for exercising, walking or engaging in other activity while waiting for the cooking function to near completion. For example, when baking a particular food item, the object recognition system 672 may suggest to the user that they take a brief walk of approximately 10 minutes to pass the time while waiting for the cooking function to complete. Such signal communication between appliances 510 can also be implemented between the object recognition system 672 and other appliances that can include, but are not limited to, blenders, mixers, ovens, ranges, washers, dryers, dishwashers and other similar appliances.

It is contemplated that changes can be made over time to the various portions of the object recognition system 672 to reflect changes in the household. For example, where a family has welcomed a new baby into the household, the object recognition system 672 can be modified to reflect the change by modifying the comprehensive menu profile 740 of a breast-feeding mother, a child, providing recommendations for recipes that might be prepared more quickly, providing baby food recipe recommendations, and other similar changes that can be sensitive to changes in the household.

It is also contemplated that the object recognition system 672 can be modified to be sensitive to certain household events, such as particularly busy work schedules, children's activity schedules, tragic events in the household (i.e., death in the family, illness, injury, etc.) and celebrations (i.e., weddings, anniversaries, birthdays, vacations, etc.). Accordingly, the object recognition system 672 can be modified to accommodate each of these personal events individually or in combination to modify the shopping list 712, recommended recipes, or other similar events to be sensitive to user's needs. By way of example, where a child has numerous athletic events such as baseball, football, gymnastics, ninja training, and other events that are occurring within the same time period, less time may be available for preparing meals. The object recognition system 672 can be sensitive to time constraints and suggest recipes that require less time to prepare and may include fewer items such that meals can be prepared in a convenient and expedient fashion so as not to take time away from family events. During such times, the object recognition system 672 can include recipes that also include proper nutrient values to be sensitive to the higher caloric needs of the people engaged in the various sporting or recreational activities.

Referring now to FIGS. 1-15, it is contemplated that the object recognition system 672 cannot only maintain and assess a current inventory manifest 560 for the appliance 510, but also of various temporarily stored items 542 and consumable products throughout the entire household. The object recognition system 672 can include a scanner 620 that may scan a receipt 690 or a series of receipts 690 that reflect items purchased that may not be stored within the appliance 510 and recognized by the object recognition system 672. Such items can include pantry items that may be stored within a cupboard or a room temperature pantry, bathroom consumable items (i.e., toilet tissue, soap, shampoo, etc.), various household consumables (i.e., air filters, light bulbs, laundry related consumables, dish washer related consumables, and other household consumable products that are depleted overtime). By way of example, and not limitation, a scanner 620 can be associated with the scanning apparatus 544, which can be a scanner 620 disposed within or outside the appliance 510 or a portable computing device 630, can be used to scan a receipt 690 acquired after a particular shopping trip to the retail store 710. Items included on this receipt 690 can be included onto the current inventory manifest 560 for the household. Over time, certain temporarily stored items 542 for the household may show a pattern of being purchased at regular intervals such that these items can be recommended to be added, or automatically added, to the shopping list 712 in accordance with these regular intervals. It is also contemplated that each storage room for the household where temporarily stored items 542 may be kept can have a dedicated scanning apparatus 544 that is integrated as part of the object recognition system 672.

For example, it is contemplated that in a household where a bottle of laundry detergent is purchased approximately once a month, the object recognition system 672 can suggest adding laundry detergent to the shopping list 712 on a monthly basis to account for the consistent uses of a laundry detergent. Based on the pattern of usage of a particular consumable or depletable item, the object recognition system 672 can include an approximate amount of a particular temporarily stored item 542 contained outside of the refrigerating appliance 510 such that items can be added to the shopping list 712.

According to the various embodiments, various temporarily stored items 542 can be suggested based upon the frequency of usage for a particular temporarily stored item 542. Where a household includes a large number of people and certain items such as laundry detergent are currently purchased in small to medium quantities, the object recognition system 672 can suggest purchasing a "jumbo sized" laundry detergent from a wholesale retailer, such as Costco or Sam's Club, to save money and also limit the number of times that laundry detergent is purchased through the course of a year. In this manner, the object recognition system 672 can make suggestions as to shopping trips that correspond to sales of certain retailers and can also be organized upon sizes available for a particular temporarily stored item 542. It is contemplated that object recognition system 672 can be configured to automatically calculate a price per ounce or price per item so that a fair comparison between products can be analyzed to see if one product may be priced less on a per ounce or per item basis when compared to a similar differently sized item available at a different retailer.

According to the various embodiments, it is contemplated that the data stored through use of the object recognition system 672 can be available for use by the retail stores 710 in developing a strategy for determining what items to purchase in a particular locale. In such an embodiment, certain raw data related to purchases made by users in a certain geographic area (zip code, county, state, etc.) of the object recognition system 672 can be provided to retail stores 710. These retail stores 710 can use this data to discover various trends around specific retail stores 710. Such trends could be helpful in assessing what products may be popular in one area but not another. Information about these trends can be useful to the retail stores 710 in making more efficient purchasing decisions. Other data that may be useful can include items purchased, sizes of items purchased, numbers of a particular item purchased, cooking skill level of residents in a certain region, recipe likes and dislikes, preferred shopping locations, days that users go shopping, days that certain items are purchased over others, and other information related to the purchasing decisions of users of the object recognition system 672. It is contemplated that personal identifying information relating to the users of the object recognition system 672 may not be shared.

Referring again to FIGS. 1-15, it is contemplated that the object recognition system 672 can monitor the placement of various items within one or more appliances 510. In this manner, the object recognition system 672 can suggest more convenient or appropriate placement of temporarily stored items 542 contained within the appliance 510. By way of example, and not limitation, where the object recognition system 672 senses that apples are placed on a top shelf 640 of a refrigerated compartment 520, the object recognition system 672 can suggest that the apples be moved where such placement may extend the life of the temporarily stored item 542.

This can also be conducted between numerous refrigerating appliances 510 contained within a certain household, where a household may have multiple refrigerating appliances 510 spaced throughout the house, such as a refrigerator in a kitchen, a mini fridge in the kitchenette, a freezer in the garage, and other potential refrigerating appliances 510, the refrigerating system may be placed in signal communication with each of the refrigerating appliances 510. It is contemplated that each of the refrigerating appliances 510 can include a dedicated scanning apparatus 544 for determining the locations of the storage surfaces 540 and the temporarily stored items 542 disposed within each appliance 510, respectively. For purposes of placing certain temporarily stored items 542 in the most convenient and efficient location within the refrigerating appliances 510, the object recognition system 672 can suggest a particular location for various items purchased.

By way of example, and not limitation, if the primary refrigerating appliance 510 in the kitchen is full and milk needs to be located in a refrigerating appliance 510, the object recognition system 672 can suggest that the milk be placed in one of the other refrigerating appliances 510 that has room to hold the temporarily stored item 542. It is contemplated that the object recognition system 672 can be sensitive to the storage space capacity within each of the refrigerating appliances 510 and can modify the shopping list 712 accordingly to account for any space limitations that may be present according to the current inventory manifest 560 of the entire household.

According to various embodiments, the capacity available within each of the refrigerating appliances 510 may be a conflict with a particular shopping list 712, such that items that need to be purchased may or may not fit within the refrigerating appliances 510 based on the current inventory manifest 560. The current object recognition system 672 can suggest usage of certain temporarily stored items 542 or recipes that incorporate certain temporarily stored items 542 that can use up remaining quantities of temporarily stored items 542 to open up space such that shopping excursions can be conducted and the shopping lists 712 can be filled to restock the house on certain items that may be needed. In such a situation, the object recognition system 672 may recognize that certain items are very low in quantity and are nearing replacement or needing replenishment. The object recognition system 672 can utilize the current inventory manifest 560 to assess the amount of space that may be gained by using up these items in a particular recipe or through consumption (i.e., having a glass of milk, making an omelet, grilling hot dogs, etc.) where a single meal may use the remaining contents 580 of these almost used temporarily stored items 542.

According to the various embodiments, the object recognition system 672 can also assess various temperatures and humidity conditions of the air within a particular refrigerating appliance 510. Based upon the contents of each compartment, the object recognition system 672 can suggest various modifications to temperature, humidity level, and other parameters that may affect the longevity of a particular temporarily stored item 542 contained within the refrigerating appliance 510. The environmental conditions of the interior 572 of the appliance 510 can be captured through various sensors or monitors that can include, but are not limited to, thermometers, humidistats, air flow sensors, and other environmental sensors. It is also contemplated that the object recognition system 672 can recognize when certain containers 578 may be negatively affecting the longevity of certain temporarily stored items 542. For example, the object recognition system 672 may recognize when certain produce items being stored in a bag may negatively impact the longevity of the produce item. The object recognition system 672 can suggest removing the produce from the bag to allow the fresh produce to breathe and allow certain chemicals and gasses, such as ethylene, to escape and limit the effect of such gasses on the produce.

According to the various embodiments, it is contemplated that the object recognition system 672 can be implemented throughout the entire household to monitor the current inventory manifest 560 of products in the kitchen, bathroom, laundry room, utility rooms, and other portions of the household to manage consumable and depletable items within the household. The system provides for the efficient management of the current inventory manifest 560, as well as an efficient system for conducting shopping excursions for replacement of consumable and depletable items that constitute the temporarily stored items 542 monitored through the object recognition system 672. In these non-limiting locations, the scanning apparatus 544 can be positioned on a wall, door, shelf 640, ceiling, floor, hanging location, or other similar location. The scanning apparatus 544 can also be configured to be stationary, operable with a door 526, operable within or upon a surface, combinations thereof and configured for other similar operative positions.

While it is contemplated that the scanning apparatus 544 be disposed within the refrigerating appliance 510, it is also contemplated that the scanning apparatus 544 can be implemented within various appliance and product storage spaces throughout the household. Accordingly, it is contemplated that various scanning apparatus 544 can be disposed within cabinets, cupboards, pantries, refrigerating appliances 510, laundry rooms, bathroom cabinets, linen closets, storerooms, utility spaces, and other similar places where consumable and depletable temporarily stored items 542 may be kept. The object recognition system 672 can aggregate all of the information obtained during the various data capturing phases 550 of the one or more scanning apparatuses 544 disposed throughout the house and aggregate a single current inventory manifest 560 of the household. The current inventory manifest 560 for the household can be itemized and categorized as needed by the user to reveal the status of various temporarily stored items 542 throughout the household. Statistics such as date purchased, date stored, number of times used, number of times moved, expiration date, lifespan, remaining quantity, previous purchases of a particular item, retail price at various retailers, effective price per unit at various retailers, and other similar statistics regarding the various temporarily stored items 542 within the current inventory manifest 560. Additionally, the current inventory manifest 560 can maintain data about space available among the various storage surfaces 540 of the various appliances 510 or other storage areas of the household.

According to the various embodiments, the various retail stores 710 discussed herein can include local markets having physical locations near the user's address, such as Walmart, Costco, Sam's Club, Kroger, Home Depot, farmer's markets, "mom and pop" retailers, hardware stores, and the like. Retail stores 710 can also include internet marketing sites (i.e., Amazon.com, ebay.com, Plated™, Blue Apron™, etc.) where various temporarily stored items 542 can be purchased and delivered to the household from local or remote locations. Retail stores 710 can also include catalog-type services where items can be purchased via internet or over the phone.

It is contemplated that the object recognition system 672 can provide a proactive system that allows the user to know when items need to be replaced before the user runs out or before a particular temporarily stored item 542 reaches its expiration date.

Additionally, the object recognition system 672 can include adaptive learning functions that allow the user's preferences to be incorporated into the object recognition system 672. Such preferences and adaptive learning information can also be used in the formation of shopping lists 712, recommendations, comprehensive menu profiles 740 and other aspects of the object recognition system 672.

It is contemplated that the object recognition system 672 including the current inventory manifest 560, shopping list 712, recipes and other aspects of the object recognition system 672 can be accessed by the user through a portable computing device 630, such as, but not limited to, cell phone, smart phone, wearable computing device, laptop, or other portable or non-portable computing device. Data 556, 558 collected, manipulated, and presented for use by the user can be stored either on the refrigerating appliance 510, on the user's computing device, or at a third location such as within a "cloud" storage apparatus. It is also contemplated that the user's portable computing device 630 can upload various programs or apps that allow the information provided by the current inventory manifest 560 and various shopping lists 712 to be integrated with apps provided by various retailers, shopping services, and other services related to the purchase of temporarily stored items 542 needed by the user. Many of these apps and programs are currently in use and may be downloaded upon a user's portable computing device 630. Future apps may be formulated for more efficient use and integration of the retailer's programs and apps in conjunction with apps and programs related to the object recognition system 672.

What is claimed is:

1. A multi-compartment storage system comprising:
    a first storage device having a first set of storage surfaces for placing temporarily stored items;
    a second storage device having a second set of storage surfaces for placing the temporarily stored items, wherein the first storage device and the second storage device are separate compartments of a single appliance; and
    an object recognition system that includes a first scanning apparatus of the first storage device, a second scanning apparatus of the second storage device, an external scanner for identifying a moved temporarily stored item and a controller that monitors locations of the temporarily stored items within the first and second sets of storage surfaces; wherein
    the first scanning apparatus and the second scanning apparatus also detect and monitor available space within the first set and the second set of storage surfaces, respectively;
    the available space is characterized by open areas between the temporarily stored items within which the moved temporarily stored item can be located;
    the moved temporarily stored item is located outside of the first and second storage devices;
    upon a request for locating the moved temporarily stored item within the available space within one of the first and second storage devices, the controller and the first scanning apparatus and the second scanning apparatus are configured to cooperatively provide a storage recommendation for locating the moved temporarily stored item from outside the first and second storage devices to within a recommended storage surface of the first and second sets of storage surfaces; and
    the storage recommendation is based upon an identity of the moved temporarily stored item as determined by the external scanner and the controller and the available space within the first set and the second set of storage surfaces.

2. The multi-compartment storage system of claim 1, wherein the external scanner is a camera for a portable computing device.

3. The multi-compartment storage system of claim 1, wherein the first scanning apparatus and the second scanning apparatus each include at least a temperature sensor, and wherein the storage recommendation is based upon a first temperature of the first storage device and a second temperature of the second storage device.

4. The multi-compartment storage system of claim 3, wherein the storage recommendation is further based upon the identity of the moved temporarily stored item, the identity including temperature storage information.

5. The multi-compartment storage system of claim 1, wherein the moved temporarily stored item is one of the temporarily stored items within the first and second storage devices and the storage recommendation is related to a relocation of the moved temporarily stored item to the recommended storage surface.

6. The multi-compartment storage system of claim 1, wherein the first scanning apparatus and the second scanning apparatus each include at least a humidity sensor, and wherein the storage recommendation is based upon a first humidity of the first storage device and a second humidity of the second storage device.

7. The multi-compartment storage system of claim 1, wherein the single appliance is a refrigerating appliance.

8. The multi-compartment storage system of claim 4, wherein each storage surface of the first and second sets of storage surfaces includes dedicated temperature sensors.

9. A multi-compartment storage system comprising:
    a plurality of storage devices that include sets of storage surfaces for placing temporarily stored items, wherein the temporarily stored items define an inventory manifest of the plurality of storage devices, wherein the plurality of storage devices are a plurality of refrigerating appliances located within a building structure;
    an object recognition system that includes respective scanning devices for each storage device of the plurality of storage devices, wherein the respective scanning devices are operated by a controller to monitor the sets of storage surfaces and the temporarily stored items of the inventory manifest, wherein the respective scanning devices detect and monitor available space within the plurality of storage devices, respectively, to form the inventory manifest, wherein the inventory manifest includes the available space within the set of storage surfaces; and an external scanning device that determines an identity of a moved temporarily stored item to be added to the inventory manifest and to be located upon a storage surface of the available space within the sets of storage surfaces, the available space being characterized by open areas between the temporarily stored items within which a moved temporarily stored item can be located, wherein the controller in cooperation with the object recognition system and the external scanning device provides a storage recommendation for locating the moved temporarily stored item from outside of the plurality of storage devices to within a recommended storage surface within the sets of storage surfaces, and wherein the storage recommendation is at least partially based upon the identity of the moved temporarily stored item and the available space within the sets of storage surfaces of the plurality of storage devices.

10. The multi-compartment storage system of claim 9, wherein the external scanning device is a camera for a portable computing device.

11. The multi-compartment storage system of claim 9, wherein each storage device of the plurality of storage devices includes a respective temperature sensor, and wherein the storage recommendation is based upon a comparison of respective storage temperatures of the plurality of storage devices.

12. The multi-compartment storage system of claim 11, wherein the storage recommendation is further based upon the identity of the moved temporarily stored item, the identity including size information and temperature storage information of the moved temporarily stored item.

13. The multi-compartment storage system of claim 9, wherein the moved temporarily stored item is one of the temporarily stored items within the sets of storage surfaces and the storage recommendation is related to a relocation of the moved temporarily stored item to the recommended storage surface of the sets of storage surfaces.

14. The multi-compartment storage system of claim 9, wherein each storage surface of the sets of storage surfaces include dedicated temperature sensors.

15. The multi-compartment storage system of claim 9, wherein the controller is configured to periodically provide an automatic storage recommendation for the inventory manifest, wherein the automatic storage recommendation is related to a relocation of at least one temporarily stored item of the inventory manifest.

16. The multi-compartment storage system of claim 9, wherein a portion of each storage device of the plurality of storage devices are climate-controlled spaces.

17. A multi-compartment storage system for a residential structure, the multi-compartment storage system comprising:

sets of storage surfaces for placing temporarily stored items, wherein the temporarily stored items define an inventory manifest of the sets of storage surfaces, wherein the sets of storage surfaces are located within respective refrigerated storage compartments of a single refrigerating appliance;

an object recognition system that includes respective scanning devices for monitoring each storage surface of the sets of storage surfaces, wherein the respective scanning devices are operated by a controller to monitor the sets of storage surfaces, the temporarily stored items of the inventory manifest and available spaces of the sets of storage surfaces that are located between the temporarily stored items of the inventory manifest, wherein the respective scanning devices detect and monitor the available spaces within the sets of storage surfaces, respectively, to form the inventory manifest, which includes the available spaces; and an external scanning device that determines an identity of a moved temporarily stored item to be added to the inventory manifest and to be moved from an area outside of the sets of storage surfaces and to a recommended storage surface of the sets of storage surfaces, the recommended storage surface being one of the available spaces of the sets of storage surfaces, the available spaces being characterized by open areas between the temporarily stored items within which a moved temporarily stored item can be located, wherein the controller in cooperation with the object recognition system and the external scanning device provides a storage recommendation for locating the recommended storage surface, and wherein the storage recommendation is at least partially based upon the identity of the moved temporarily stored item, the identity including size information, the available spaces within the sets of storage surfaces, and temperature storage information of the moved temporarily stored item.

* * * * *